(12) United States Patent
Xiao et al.

(10) Patent No.: US 6,864,329 B2
(45) Date of Patent: Mar. 8, 2005

(54) HYBRID ORGANIC-INORGANIC LIGHT EMITTING POLYMERS

(75) Inventors: Steven Xiao, Laval (CA); My T. Nguyen, Kirkland (CA)

(73) Assignee: American Dye Source, Inc., Baie D'Urfé (CA)

( * ) Notice: Subject to any disclaimer, the term of this patent is extended or adjusted under 35 U.S.C. 154(b) by 0 days.

(21) Appl. No.: 10/233,825

(22) Filed: Sep. 3, 2002

(65) Prior Publication Data

US 2003/0204038 A1 Oct. 30, 2003

(30) Foreign Application Priority Data

Apr. 16, 2002 (CA) .............................................. 2381833

(51) Int. Cl.⁷ .......................... C08G 77/42; C09K 11/02
(52) U.S. Cl. .................. 525/474; 525/479; 252/301.35; 528/25; 528/32; 528/33; 528/37
(58) Field of Search ................................ 525/474, 479; 528/25, 32, 33, 37; 252/301.35

(56) References Cited

U.S. PATENT DOCUMENTS

| | | | | |
|---|---|---|---|---|
| 3,783,480 | A | * | 1/1974 | Booe .......................... 29/25.42 |
| 5,047,472 | A | * | 9/1991 | Alsamarraie et al. .......... 525/68 |
| 5,247,190 | A | | 9/1993 | Friend et al. |
| 5,484,867 | A | | 1/1996 | Lichtenhan et al. |
| 5,589,562 | A | | 12/1996 | Lichtenhan et al. |
| 5,817,430 | A | | 10/1998 | Hsieh |
| 5,869,350 | A | | 2/1999 | Heeger et al. |
| 6,391,471 | B1 | * | 5/2002 | Hiraoka et al. .............. 428/623 |
| 6,517,958 | B1 | * | 2/2003 | Sellinger et al. ............. 428/690 |
| 6,518,357 | B1 | * | 2/2003 | Rajagopalan et al. ........ 524/588 |
| 6,565,763 | B1 | * | 5/2003 | Asakawa et al. .............. 216/56 |
| 2003/0022102 | A1 | * | 1/2003 | Hiraoka et al. ........... 430/270.1 |

FOREIGN PATENT DOCUMENTS

WO    WO 98/27136    6/1998

OTHER PUBLICATIONS

Son, S., et al., Science, 1995, 269, 376.
Liao, L., Pang, Y., et al., Macromolecules, 2001, 34, 7300.

* cited by examiner

Primary Examiner—Jeffrey B. Robertson
(74) Attorney, Agent, or Firm—Goudreau Gage Dubuc

(57) ABSTRACT

Provided herein is an inorganic-organic hybrid conjugated polymer having opto-electronic function and a process to make the same. The disclosed polymer contains inorganic or organic bulky groups in the polymer backbone or as pedant groups and has a general formula:

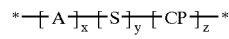

wherein:

A is a bulk group, comprising at least one silsesquioxane, serving as a positional anchor for the polymer. S serving as a spacer includes alkyl, cycyloalkyl group of from 1 to 30 carbon atoms, or aryl or substituted aryl of from 6 to 50 carbon atoms, or herteroaryl or substituted heteroaryl of from 4 to 50 carbons. CP represents any conjugated polymer segment at least one portion thereof comprising an opto-electronic function, for example, polyacetylenes, polyphenylenes, polyphenylenevinylenes, polythiophenes, polypyrroles, polyanilines, polyfluorences, and any conjugated co-polymer segment. x, y and z are positive integers, where x and z is equal or greater than 1. These integers determine the configuration of such a hybrid polymer system as expressed in the above formula.

20 Claims, 9 Drawing Sheets

HYBRID ORGANIC-INORGANIC LIGHT EMITTING POLYMERS

FIELD OF THE INVENTION

This invention relates to hybrid organic-inorganic conjugated polymers having opto-electronic properties. The invention also relates to a process for obtaining same. Among possible applications, the conjugated polymer of the present invention may be used as a functional coating in various opto-electronic devices, such as electroluminescent displays, solar cells, sensors, thin film organic transistors, lasers and electrochemical cells. The conjugated polymer of the present invention exhibits high thermal stability, high solubility in standard solvents and good adhesion to common substrates.

BACKGROUND OF THE INVENTION

This invention relates to hybrid organic-inorganic conjugated polymers for preferred applications in opto-electronic devices, such as electroluminescent displays, solar cells, sensor, thin film organic transistors, lasers and electrochemical cells. Also provided is a process for making the conjugated polymers of the present invention.

In a surprising departure from the prior art, the inorganic portion of the hybrid conjugated polymers of the present invention contain segments of silsesquioxane in the polymer backbone or as pendant groups.

It is known that polymers with conjugated backbone such as poly(p-phenylene), poly(p-phenylenevinylene), polyfluorene, polythiophene and polyaniline are important class of materials for applications in electronic and optical devices. However, these polymers are difficult to process and fabricate into devices due to their poor adhesion, low solubility and instability at high temperature.

U.S. Pat. No. 5,247,190 discloses an electroluminescent device comprising a light emitting layer derived from a thin film of poly(p-phenylenevinylene) wherein the phenylene ring may optionally carry one or more substituents each independently selected from alkyl, alkoxy, halogen or nitro groups.

U.S. Pat. No. 5,869,350 teaches to fabricate electroluminescent devices using solvent soluble light emitting polymers such as poly(2-methoxy-5-(2'-ethylhexyloxy)-p-phenylenevinylene).

PCT Patent Application WO 98/27136 teaches to prepare soluble aryl substituted poly(p-phenylenevinylene) for applications in electroluminescent devices. The co-polymerization of different aryl substituted monomers produced polymers that emit light at different wavelengths.

U.S. Pat. No. 5,817,430 teaches to prepare substituted derivatives of poly(p-phenylenevinylene) for applications in electroluminescent devices by using organic chain end controlling additives to improve the solubility.

Although the use of organic conjugated polymers have been substantial promise for electrooptical applications, devices made from these materials are still suffering from short useful lifetime. The lifetime of such devices and the stability of materials under operation conditions remain important issues for commercialization.

One cause responsible for device instability was shown to be polymer interchain interactions such as aggregation, excimer formation, and polaron pair formation.

Hence, controlling interchain interactions remains a challenge in the design and synthesis of such conjugated polymers. Otherwise various electrooptical applications would not be possible under normal operation.

One potential approach at solving this problem has been the introduction of structural asymmetry in the polymer chain thereby limiting its ability to pack effectively in the solid state. For example, Son et al [Son, S., etal., *Science*, 1995, 269, 376] engineered the distribution of cis-linkages in poly(phenylenevinylene) chains. The cis linkages interrupt conjugation and interfere with the packing order of the polymer chains. Pang et al. [Liao, L., Pang, Y., et al., Macromolecules, 2001, 34, 7300] introduced a meta-linkage in the main conjugated chain of the polymer and the meta-linkage simultaneously interrupts the conjugation length of a π-conjugated polymer and allows the polymer to bend and twist more effectively than a para-linkage.

Another potential approach has been to design a polymer that is structurally required to twist in a manner that limits or precludes effectively π-stacking, while still having sufficiently long conjugation length chromophores to allow fine-tuning of the emission wavelength, intensity and lifetime.

However, one approach remains unexplored. Thus the present invention relates to a third approach relying on the use of bulky and structural substituents to limit close approach between aromatic chromophores. This approach is surprisingly advantageous in many respects. By having selected effective bulky substituents, the present inventors have been able to provide conjugated polymers having reduced chain mobility and reduced interchain aggregation. The polymers of the present invention display a preventative effect on excimer formation and an increase in thermal stability. The improved properties will provide an increase in the efficiency and lifetime of devices made from these polymers. The preferred bulky substituents are from a known genus of compounds called silsesquioxanes.

In a parallel and somewhat unrelated art, it is known that hybrid organic-inorganic polymers containing segments of silsesquioxane exhibit a number of potentially useful properties including high temperature stability in air and good adhesion to a number of substrates. These materials are also resistant to oxidation and degradation by ultraviolet light. They have been used as protective coatings for electronic devices and other substrates and as precursors for ceramic coatings, foams, fibers, and other articles.

However, it has not been known in the art to use silsesquioxane segments in the design and preparation of conjugated polymers having opto-electronic properties such as light emitting polymers.

For example, U.S. Pat. No. 5,484,867 teaches the preparation of reactive polyhedral oligomeric silsesquioxane oligomers and to the subsequent synthesis of polymers containing the resulted segments of silsesquioxane. However, such polymers do not emit light nor exhibit any opto-electronic properties.

U.S. Pat. No. 5,589,562 teaches the preparation of linear copolymers, which contain regularly alternating segments and bridging group segments of silsesquioxane. Again, such polymers do not emit light nor exhibit opto-electronic properties.

Thus, the prior art, in general has failed to provide conjugated polymers combining excellent opto-electronic properties and advantageous stability under normal operating conditions of opto-electronic devices.

It is thus an object of the present invention to remedy the disadvantages of the prior art by providing hybrid organic-inorganic conjugated polymers having improved stability rendering these polymers useful and stable under normal operating conditions of opto-electronic devices.

SUMMARY OF THE INVENTION

Provided herein are improved organic-inorganic conjugated polymers having opto-electronic functions. In this invention, the inventors demonstrate how to incorporate silsesquioxane segments (bulky substituents) into conjugated polymers having opto-electronic functions so as to provide improved conjugated polymers having opto-electronic functions. The silesquioxane segments are incorporated either on the polymer backbone or as pendant groups. Incorporating silsesquioxane segments into conjugated polymer systems, increases the decomposition temperature and glass transition temperature, reduces flammability and heat evolution, and enhances mechanical and physical properties as well. These enhancements result from silsesquioxane's ability to control the motion of the chains while still maintaining the processability and mechanical properties of the base polymers. This is a direct result of silsesquioxane's nanoscopic size and its relationship to polymer dimension.

More specifically, in accordance with the present invention, there is provided a process for the preparation of hybrid organic-inorganic conjugated polymers for applications in electronic devices, such as electroluminescent displays, thin film transistors, solar cells, sensors and electrochemical cells. More particularly, this invention relates to the process for preparation of conjugated polymers containing inorganic or organic bulky group in the polymer backbone or as pendant groups and having a general formula:

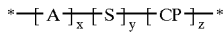

wherein:

A is a bulk group, comprising at least one silsesquioxane, serving as a positional anchor for the polymer. S serving as a spacer includes alkyl, cycyloalkyl group of from 1 to 30 carbon atoms, or aryl or substituted aryl of from 0 to 50 carbon atoms, or herteroaryl or substituted heteroaryl of from 4 to 50 carbons. CP represents any conjugated polymer segment at least one portion thereof comprising an opto-electronic function, for example, polyacetylenes, polyphenylenes, polyphenylenevinylenes, polythiophenes, polypyrroles, polyanilines, polyfluorenes, and any conjugated co-polymer segment.

x, y and z are positive integers, where x and z is equal or greater than 1. These integers determine the configuration of such a hybrid polymer system as expressed in the above formula. For instances, when x=1, y=0, z=1, the configuration is

A—CP

When x=1, y=1, z=1, the configuration is

A—S—CP

The above two cases can be viewed as one-end anchored. When x=2, z=1, the configurations can be:

A—CP-A

A—S—CP-A

A—S—CP—S-A

In these cases, the conjugated polymer can be viewed as both-end anchored.

When x≧3, some possible configurations are:

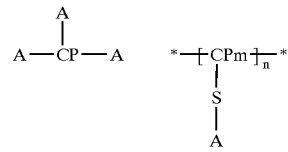

and so on . . .

wherein CPm is the monomer or oligomer making up the conjugated polymer CP segment. In these cases, the conjugated polymers can be viewed to be pedanted anchored.

When x=1, y≧2, some possible configurations are:

CP—A—CP

CP—S—A—S—CP

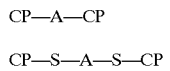

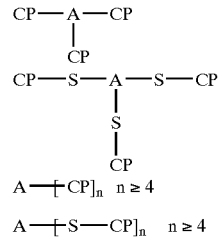

A—[CP]$_n$  n ≥ 4

A—[S—CP]$_n$  n ≥ 4

These cases can be viewed as center-anchored.

Other objects, advantages and features of the present invention will become more apparent upon reading of the following non-restrictive description of preferred embodiments thereof, given by way of example only with reference to the accompanying drawings.

DESCRIPTION OF THE PREFERRED EMBODIMENT

Figure 1:
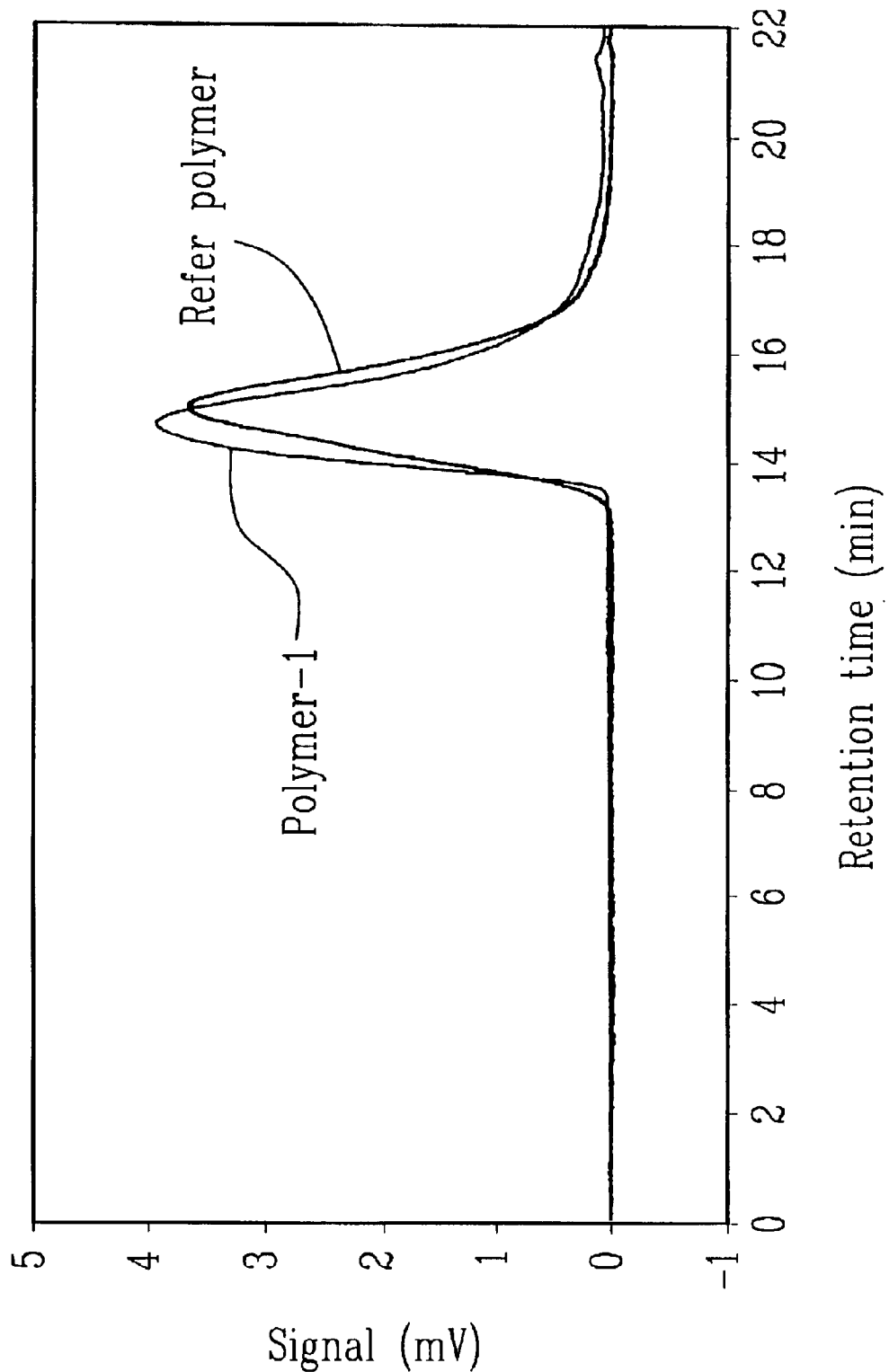
FIG. 1 illustrates the GPC profile of polymer 1 prepared in the present invention and a referred polymer without silsesquioxane segments in the polymer backbone or as pendant groups.

This invention relates to the process for the preparation of hybrid organic-inorganic conjugated polymers for applications in various electronic devices, such as electroluminescent displays, thin film transistors, solar cells, sensor, lasers and electrochemical cells. More particularly, this invention relates to the process for preparation of conjugated polymers containing inorganic or organic bulky group in the polymer backbone or as pendant groups and having a general formula:

Wherein:

A is a bulk group, specifically silsesquioxanes, which serves as a positional anchor. S is a spacer group, which may be alkyl, cycyloalkyl group of from 1 to 30 carbon atoms, or aryl or substituted aryl of from 6 to 50 carbon atoms, or herteroaryl or substituted heteroaryl of from 4 to 50 carbons. CP represents any conjugated polymer segment, for example, polyacetylenes, polyphenylenes, polyphenylenevinylenes, polythiophenes, polypyrroles, polyanilines, polyfluorenes, and any conjugated co-polymer segment.

x, y and z are positive integers, where x and z are equal or greater than 1. These integers determine the configuration of such a hybrid polymer system as expressed in the above formula. For instances, when x=1, y=0, z=1, the configuration is

A—CP

When x=1, y=1, z=1, the configuration is

A—S—CP

The above two cases can be viewed as one-end anchored.
When x=2, z=1, the configurations may be:

A—CP-A

A—S—CP-A

A—S—CP—S-A

In these cases, the conjugated polymer can be viewed as both-end anchored.
When x≧3, some possible configurations are:

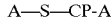
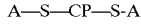

and so on . . .

wherein CPm is the monomer or oligomer making up the conjugated polymer CP segment. In these cases, the conjugated polymers can be viewed to be pedanted anchored.

When x=1, y≧2, some possible configurations are:

CP—A—CP

CP—S—A—S—CP

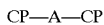

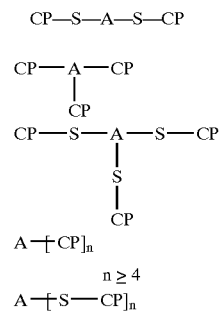

$n \geq 4$

These cases can be viewed as center-anchored.

In the above formulas, preferred anchor groups are bulky groups, particularly silsesquioxanes. Preferred spacers are alkyl group, aryl groups, substituted aryl groups, heteroatom aryl groups that bridge the anchor group and conjugated polymer segments. Preferred conjugated polymers are organic π-conjugated polymers such as polyphenylenes, polyphenylenevinylenes, polythiophenes, polypyrroles, polyanilines, polyfluorences, derivatives thereof and any conjugated co-polymer.

To assist in understanding the present invention, the following structures of anchor groups, spacer groups and conjugated polymers are provided as examples, however, those should not, of course, be construed as specifically limiting the invention and such variations of the invention, now know or later developed, which would be within the purview of one skilled in the art are considered to fall within the scope of the invention as described herein and herein after claims.

Examples of silsesquioxanes anchor groups are

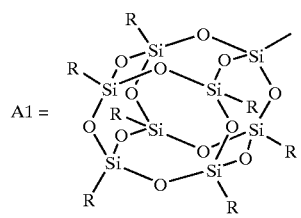

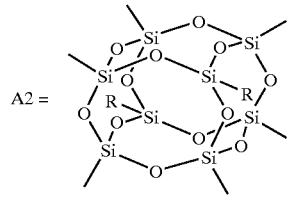

-continued

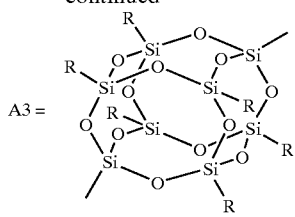

wherein

R may generally be substituted or unsubstituted monovalent hydrocarbon groups having typically from 1 to 20 carbon atoms. Examples of alkyl groups include methyl, ethyl, propyl, butyl, pentyl, hexyl, heptyl octyl, cyclopentyl, and cyclohexyl groups. The R may also include alkenyl groups such as vinyl, allyl, hexenyl, heptenyl, octenyl, and aryl groups such as phenyl, alkylphenyl and alkoxyphenyl. Alkoxy groups include the alkyl and alkenyl groups listed above linked by an oxygen atom.

Examples of spacer groups are:

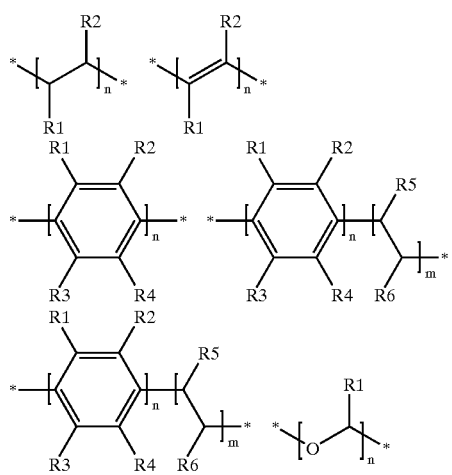

wherein

R, R1, R2, R3, R4, R5 and R6 may independently be hydrogen, substituted or unsubstituted monovalent hydrocarbon groups having typically from 1 to 20 carbon atoms. Examples of alkyl groups include methyl, ethyl, propyl, butyl, pentyl, hexyl, heptyl octyl, cyclopentyl, and cyclohexyl groups. The R, R1, R2, R3, R4, R5 and R6 groups may also include alkenyl groups such as vinyl, allyl, hexenyl, heptenyl, octenyl, and aryl groups such as phenyl, alkylphenyl and alkoxyphenyl. Alkoxy groups include the alkyl and alkenyl groups listed above linked by an oxygen atom.

Examples of conjugated polymers are:

Polyacetylenes, polyetylenes and their derivatives such as

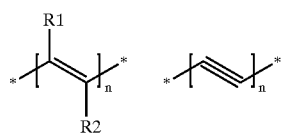

Polyphenylene and its derivatives such as

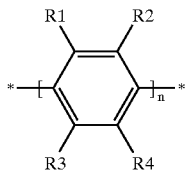

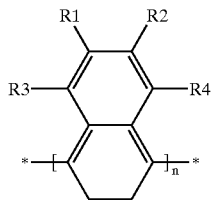

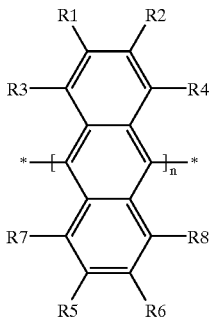

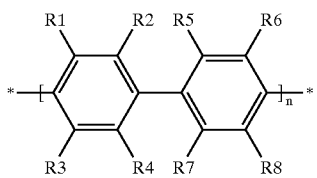

Polythiophene and its derivatives such as

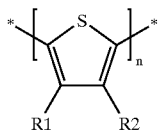

Polypyroles, polypyridines, polyanilines and their datives such as

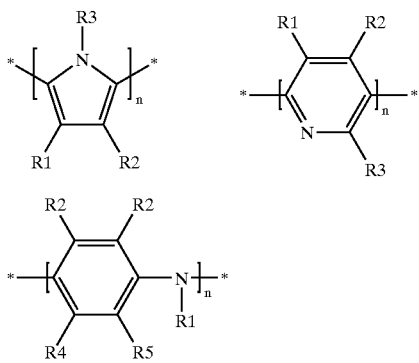

Polyflurorenes and their datives such as

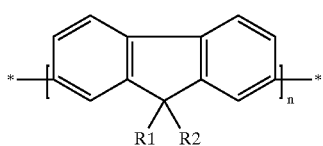

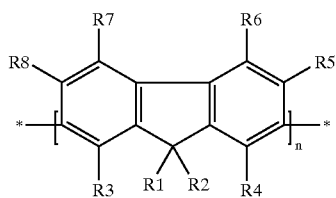

Spiro and its derivatives such as

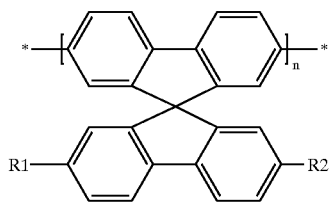

Copolymers made from any two or more conjugated polymeric segments such as but not limited to these shown in the above examples, in either alternative or random manners such as

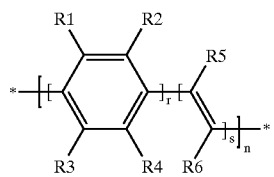

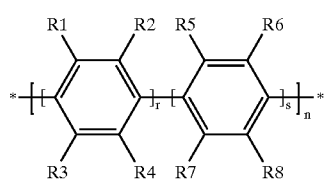

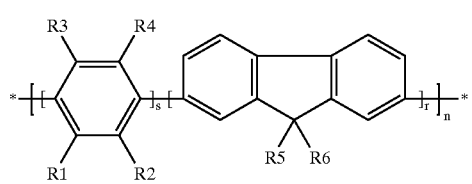

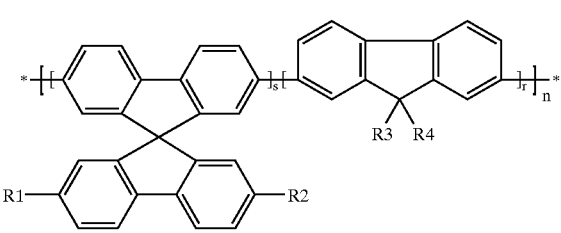

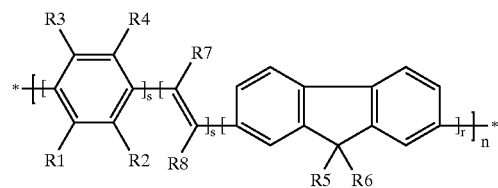

wherein
r, s, m, and n are independently integers while n are not less then 1. R, R1, R2, R3, R4, R5, R6, R7, and R8 may independently be hydrogen, substituted or unsubstituted monovalent hydrocarbon groups having typically from 1 to 20 carbon atoms. Examples of alkyl groups include methyl, ethyl, propyl, butyl, pentyl, hexyl, heptyl octyl, cyclopentyl, and cyclohexyl groups. The R, R1, R2, R3, R4, R5, R6, R7, and R8 may also independently include alkenyl groups such as vinyl, allyl, hexenyl, heptenyl, octenyl, and aryl groups such as phenyl, alkylphenyl and alkoxyphenyl. Alkoxy groups include the alkyl and alkenyl groups listed above linked by an oxygen atom. If applicable, R, R1, R2, R3, R4, R5, R6, R7, and R8 may independently also represent any functional group such cyano, isocyano, hydroxyl, halide, amino, sulfonate, etc. Additionally, at certain circumstance, two adjacent groups may combine to form a cylco-groups or hetro-atomic cyclo groups, for examples:

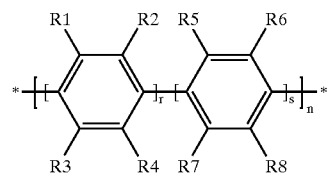

↓

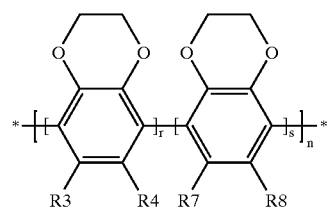

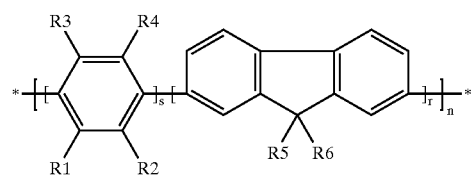

↓ alkoxyphenyl. Alkoxy groups include the alkyl and alkenyl groups listed above linked by an oxygen atom.
n is an integer from 1 to 1000.

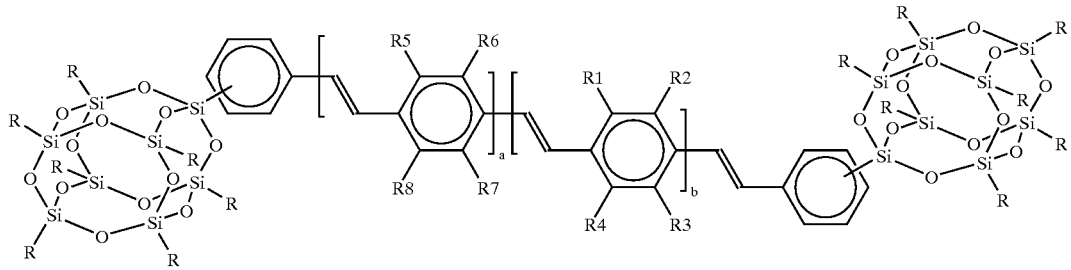

wherein
R, R1, R2, R3, R4, R5, R6, R7 and R8 may generally be substituted or unsubstituted monovalent hydrocarbon groups having typically from 1 to 20 carbon atoms. Examples of alkyl groups include methyl, ethyl, propyl, butyl, pentyl, hexyl, heptyl octyl, cyclopentyl, and cyclohexyl groups. The R, R1, R2, R3 and R4 groups may also include alkenyl groups such as vinyl, allyl, hexenyl, heptenyl, octenyl, and aryl groups such as phenyl, alkylphenyl and alkoxyphenyl. Alkoxy groups include the alkyl and alkenyl groups listed above linked by an oxygen atom.

a and b may vary from 0.01 to 0.99.

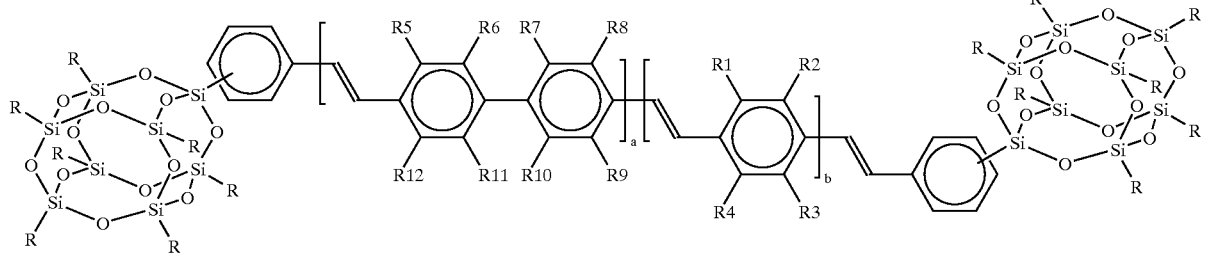

wherein
R, R1, R2, R3, R4, R5, R6, R7, R8, R9, R10, R11 and R12 may generally be substituted or unsubstituted monovalent hydrocarbon groups having typically from 1 to 20 carbon atoms. Examples of alkyl groups include methyl, ethyl, propyl, butyl, pentyl, hexyl, heptyl octyl, cyclopentyl, and cyclohexyl groups. The R, R1, R2, R3 and R4 groups may also include alkenyl groups such as vinyl, allyl, hexenyl, heptenyl, octenyl, and aryl groups such as phenyl, alkylphenyl and alkoxyphenyl. Alkoxy groups include the alkyl and alkenyl groups listed above linked by an oxygen atom.

a and b may vary from 0.01 to 0.99.

Synthesis of Hybrid Polymers

The polymerization method and the molecular weights of the resulting polymers used in the present invention are illustrative only. The polymers may be prepared by condensation polymerization such as Wittig reaction, Horner-Emmons reaction, Knoevenagel condensation, Heck reaction, or Suzuki coupling.

In the following examples, the polymerization was performed in a three-neck glass reactor equipped with a water condenser, magnetic stirrer, electrical heating mental, temperature controller and nitrogen gas inlet. The products were analyzed using a FTIR Spectrophotometer (Perkin-Elmer, Model 1760), a NMR (300 MHz, Perkin Elmer). The glass transition and melting temperature of the products were determined using a differential scanning calorimeter (Instrument Specialist Incorporated, Model DSC 550). The average molecular weight was determined by gel permeable chromatography (Waters Breeze, trademark) using tetrahydrofuran as eluent and polystyrene standards.

EXAMPLE 1

Synthesis of Polymer 1

About 1.50 grams of 1-[2-(chlorobenzyl)ethyl]-3,5,7,9,11,13,15-heptacyclo-pentylpentacyclo[9.5.1.13,9.15,15.17,13]octasiloxane (available from Hybrid Plastics, California) and 4.5 grams of 2-methoxy-5-(2'-ethylhexyloxy)-1,4-bis (chloromethyl)benzene (available from American Dye Source, Inc.) were dissolved in 400 ml of tetrahydrofuran and then added quickly to a solution containing 750 ml of tetrahydrofuran and 15.0 grams of potassium tert-butoxide in the three-neck reaction flask. The resulting orange-red viscous solution was stirred overnight and then poured into 2000 ml of methanol. The precipitated red solid was collected by filtration, washed with methanol and air dried to provide 2.07 grams of a soluble polymer. Spectroscopic analysis of the product was consistent with a polymer having the structure in formula 1 below.

Formula 1

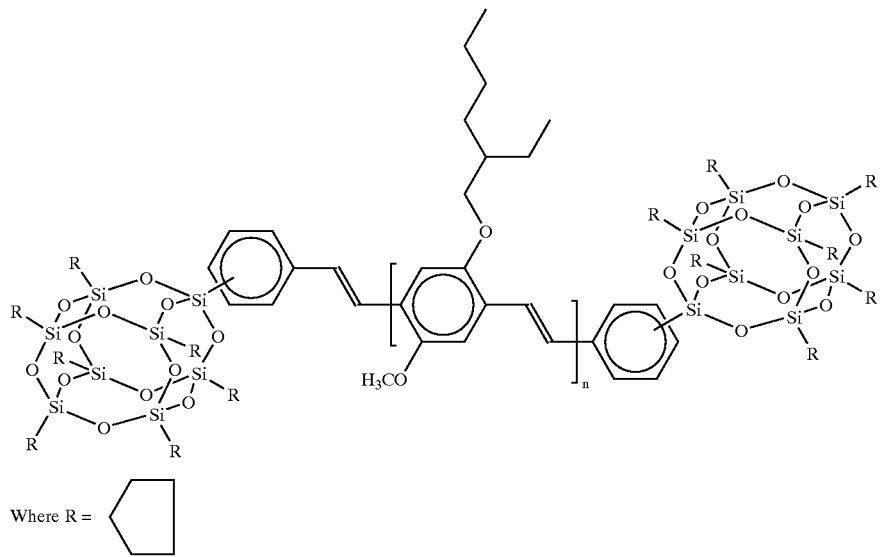

Where R = ⬠

EXAMPLE 2

Synthesis of Polymer 2

About 1.50 grams of 1-[2-(chlorobenzyl)ethyl]-3,5,7,9,11,13,15-heptacyclo-pentylpentacyclo[9.5.1.13,9.15,15.17,13]octasiloxane (available from Hybrid Plastics, California), 3.6 grams of 2-methoxy-5-(2'-ethylhexyloxy)-1,4-bis(chloromethyl)benzene (available from American Dye Source, Inc.) and 1.8 grams of 4,4'-bis(chloromethyl)-1,1'-biphenyl (available from Aldrich Chemical) were dissolved in 400 ml of tetrahydrofuran and then added quickly to a solution containing 750 ml of tetrahydrofuran and 15.0 grams of potassium tert-butoxide in the three-neck reaction flask. The resulting orange viscous solution was stirred overnight and then poured into 2000 ml of methanol. The precipitated orange solid was collected by filtration, washed with methanol and air dried to provide 1.63 grams of a soluble polymer. Spectroscopic analysis of the product was consistent with a polymer having the structure in formula 2 below.

Formula 2

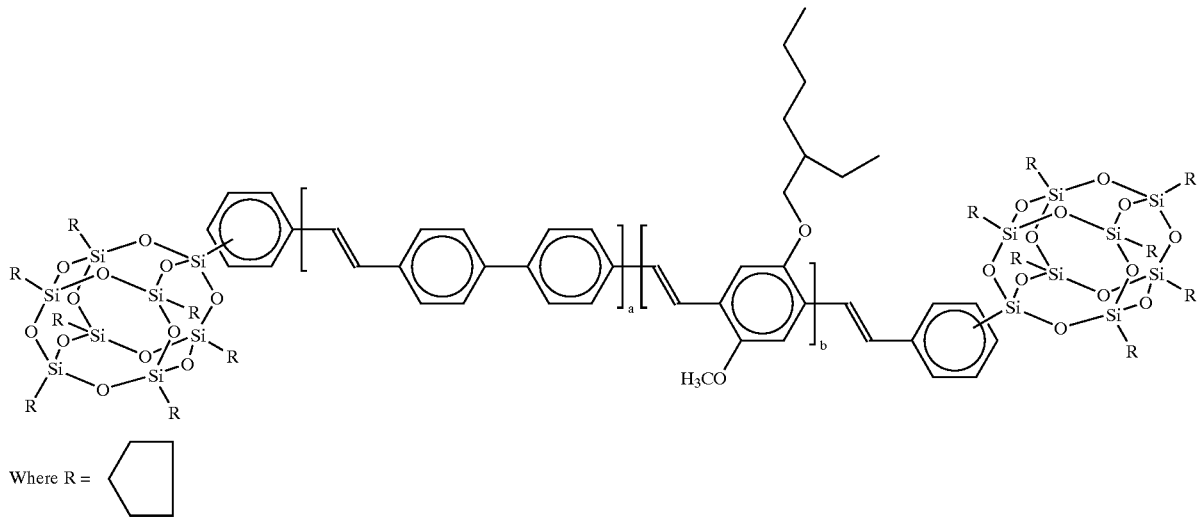

Where R = ⬠

EXAMPLE 3

Synthesis of Polymer 3

About 1.50 grams of 1-[2-(chlorobenzyl)ethyl]-3,5,7,9,11,13,15-heptacyclo-pentylpentacyclo[9.5.1.13,9.15,15.17,13]octasiloxane (available from Hybrid Plastics, California), 3.6 grams of 2-methoxy-5-(2'-ethylhexyloxy)-1,4-bis(chloromethyl)benzene (available from American Dye Source, Inc.) and 1.8 grams of 3,6-bis(chloromethyl)durene (available from Aldrich Chemical) were dissolved in 400 ml of tetrahydrofuran and then added quickly to a solution containing 750 ml of tetrahydrofuran and 15.0 grams of potassium tert-butoxide in the three-neck reaction flask. The resulting orange viscous solution was stirred overnight and then poured into 2000 ml of methanol. The precipitated orange solid was collected by filtration, washed with methanol and air dried to provide 1.63 grams of a soluble polymer. Spectroscopic analysis of the product was consistent with a polymer having the structure in formula 3 below.

3.6 grams of 2-methoxy-5-(2'-ethylhexyloxy)-1,4-bis(chloromethyl)benzene (available from American Dye Source, Inc.) and 1.8 grams of of 9,10-bis(chloromethyl) anthracene (available from TCI) were dissolved in 400 ml of tetrahydrofuran and then added quickly to a solution containing 750 ml of tetrahydrofuran and 15.0 grams of potassium tert-butoxide in the three-neck reaction flask. The Formula 3

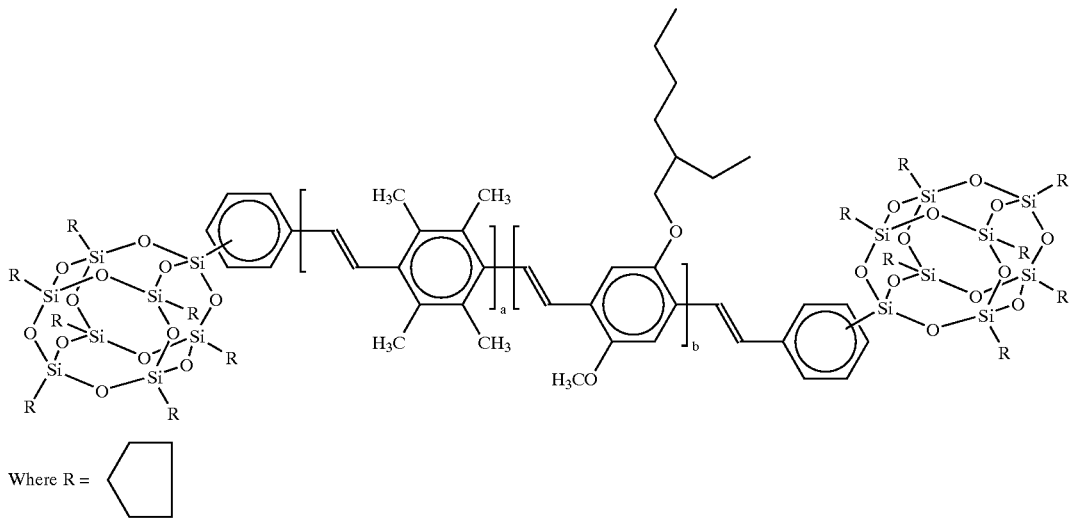

EXAMPLE 4

Synthesis of Polymer 4

About 1.50 grams of 1-[2-(chlorobenzyl)ethyl]-3,5,7,9,11,13,15-heptacyclo-pentylpentacyclo[9.5.1.13,9.15,15.17,13]octasiloxane (available from Hybrid Plastics, California), resulting orange viscous solution was stirred overnight and then poured into 2000 ml of methanol. The precipitated orange solid was collected by filtration, washed with methanol and air dried to provide 1.76 grams of a soluble polymer. Spectroscopic analysis of the product was consistent with a polymer having the structure in formula 4 below.

Formula 4

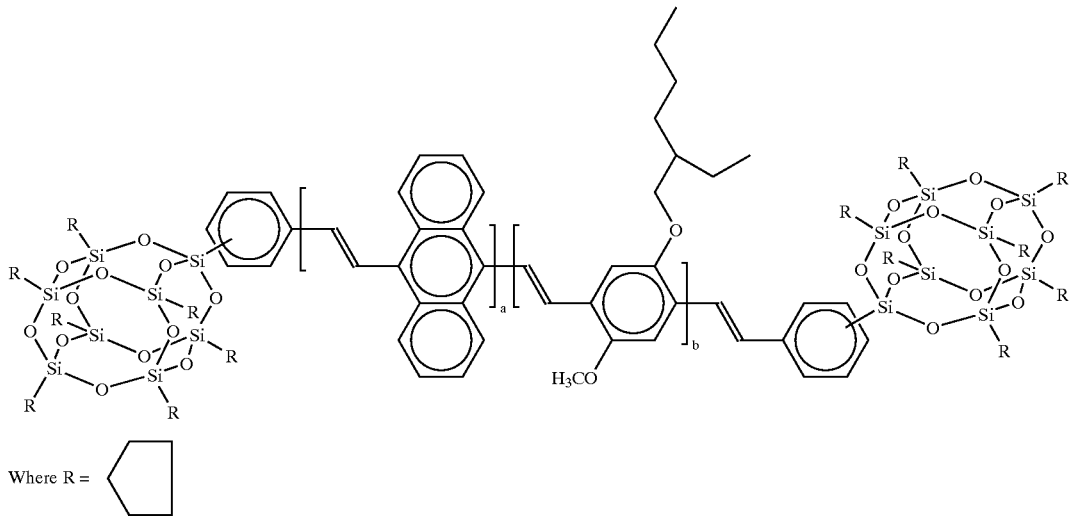

EXAMPLE 5

Synthesis of Polymer 5

About 10.18 grams of 1,3,5,7,9,11,13,15-octakis(dimethylsilyloxy)pentacyclo-[9.5.1.1$^{3,9}$.1$^{5,15}$.1$^{7,13}$] octasiloxane (available from Hybrid Plastics, California) and 3 miligrams of hydrogen hexachloroplatinate (IV) were dissolved in 100 ml of toluene. The mixture was heated to 70° C. under constant stirring and nitrogen atmosphere. A toluene solution containing 0.8 grams of 4-chloromethylstyrene (available from Aldrich Chemical) was slowly added into the reaction mixture via a dropping funnel. The reaction was continued for 6 hours. After cooled to room temperature, the product solution was filtered three times through a silica gel column to remove color and trace of catalyst. The solvent was then removed until dryness using a rotary evaporator. A white waxy product (8.7 grams) was obtained after recrystallization in methanol.

About 0.5 grams of the obtained product and 0.70 grams of 2-methoxy-5-(2'-ethylhexyloxy)-1,4-bis(chloromethyl)benzene (available from American Dye Source, Inc.) were dissolved in 300 ml of tetrahydrofuran. A solution containing 80 ml of tetrahydrofuran and 3.0 grams of potassium tert-butoxide was added quickly to the reaction flask. The resulting orange-red viscous solution was stirred overnight and then poured into 500 ml of methanol. The precipitated red solid was collected by filtration, washed with methanol and air dried to provide 0.71 grams of a soluble polymer. Spectroscopic analysis of the product was consistent with a polymer having the structure in formula 5 below.

EXAMPLE 6

Synthesis of Polymer 6

About 0.4 grams of NaH (60% in mineral oil, available from Aldrich Chemical) was added in portion into 30 ml of tetrahydrofran containing 2.0 grams of 2-thienylethanol (available from Aldrich Chemical). The reaction mixture was heated to 40° C. for 2 hours. A solution containing 40 ml of tetrahydrofuran and 1.0 grams of 1-[chlorobenzyl]-3,5,7,9,11,13,15-heptacyclopentylpentacyclo-[9.5.1.13,9.15, 15.17,13]octasiloxane (available from Hybrid Plastics, California) was slowly added into the reaction mixture via a dropping funnel. The reaction was continued overnight at 50° C. The solvent was removed to dryness using a rotary evaporator. The resulting waxy white solid product was washed with water and dried in air. After re-crystallized in ether, a white solid product was obtained with yield of 1.2 grams.

About 200 ml chloroform solution dissolving with 4.0 grams of ferric chloride (available for Aldrich Chemical) was quickly added into 100 ml of chloroform solution containing 4.0 grams of 3-hexythiophene and 1.2 grams of the product obtained from the previous step. The reaction was stirred at room temperature for 24 hours. The polymer was precipitated in 700 ml of methanol solution containing 3 ml of hydrazine. The dark brown solid was obtained by vacuum filtration, washed copiously with methanol and dried in air with a yield of 3.8 grams. Spectroscopic analysis of the product was consistent with a polymer having the structure in formula 6 below.

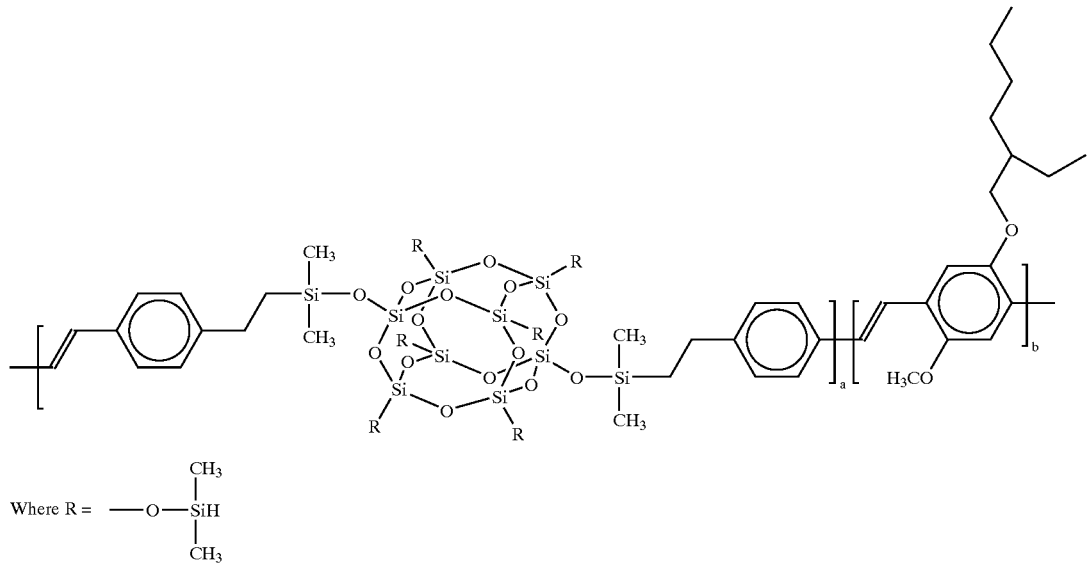

Formula 5

FORMULA 6

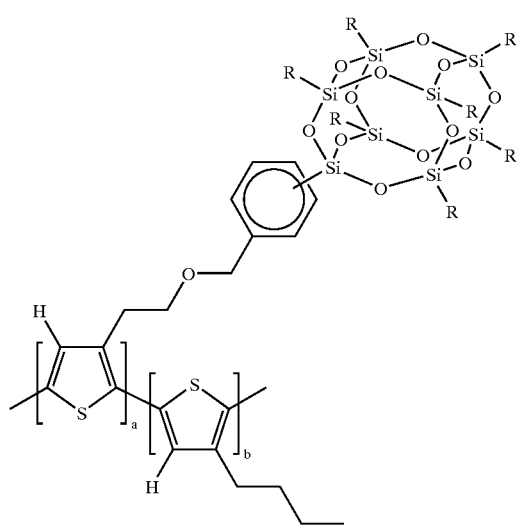

EXAMPLE 7

Synthesis of Polymer 7 (120P)

A dried 3-neck round-bottom flask (500 ml) was fluxed with nitrogen for 30 minutes. In this flask, 30 ml of anhydrous DMF, 2.1 g of 2,2'-dipyridyl (available from Aldrich Chemical), 3.7 g of cyclooctadiene (available from Aldrich Chemical) and 3.8 g of bis(1,5-cyclooctadiene)nickel(0) (available from Aldrich Chemicals) were quickly added. The mixture was heated to 80° C. for 20 minutes, and a shiny purple solution was observed. To this purple solution, 40 ml of deoxygenated toluene containing 1.6 g of 2,5-dichloro-1-(6-methyl-6-cayno-heptaloxy) benzene (available from American Dye Source, Inc.) was added quickly. The mixture was stirred for 48 hours at 80° C. before 0.05 g of 1-[chlorophenyl]-3,5,7,9,11,13,15-heptacyclopentylpentacyclo-[9.5.1.13,9.15,15.17,13] octasiloxane (available from Hybrid Plastics, California) was added in. The mixture was then stirred for 48 hours at 80° C. After cooling to room temperature, the reaction mixture was poured into 600 ml of HCl, 600 ml of acetone, and 600 ml of methanol and stirred for 2 hours. The solid was filtered out, redissolved in chloroform, and precipitated in large amount methanol. The pale yellow solid was dried in vacuum at 60° C. for 48 hours and yielded 0.6 g of the final product. Spectroscopic analysis of the final product was consistent with a polymer having the structure in formula 7 below Formula 7

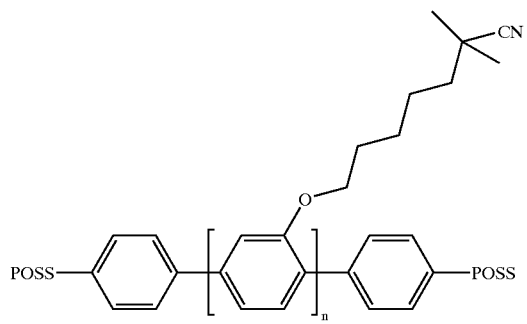

Where POSS =

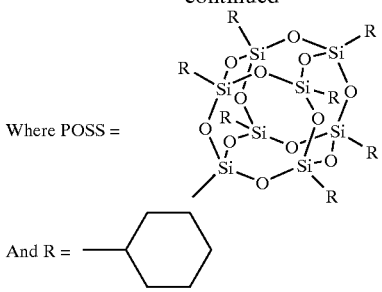

And R = —⟨cyclohexyl⟩

EXAMPLE 8

Synthesis of Polymer 8 (130P)

A dried 3-neck round-bottom flask (500 ml) was fluxed with nitrogen for 30 minutes. In this flask, 75 ml of anhydrous DMF, 5.0 g of 2,2'-dipyridyl (available from Aldrich Chemical), 7.5 g of cyclooctadiene (available from Aldrich Chemical) and 10 g of bis(1,5-cyclooctadiene)nickel(0) (available from Aldrich Chemicals ) were quickly added. The mixture was heated to 80° C. for 20 minutes, and a shine purple solution was observed. To this purple solution, 100 ml of deoxygenated toluene containing 8.5 g of 9,9-dihexyl-2,7-dibromoflurene (available from American Dye Source, Inc.) was added quickly. The mixture was stirred for 48 hours at 80° C. before 0.5 g of 1-[chlorophenyl]-3,5,7,9,11, 13,15-heptacyclopentylpentacyclo-[9.5.1.13,9.15,15.17,13] octasiloxane (available from Hybrid Plastics, California) was added in. The mixture was then stirred for 48 hours at 80° C. After cooling to room temperature, the reaction mixture was poured into 1000 ml of HCl, 1000 ml of acetone, and 1000 ml of methanol and stirred for 2 hours. The solid was filtered out, redissolved in chloroform, and precipitated in large amount methanol. The pale yellow fiber-like product was dried in vacuum at 60° C. for 48 hours and yielded 4.8 g of the final product. Spectroscopic analysis of the final product was consistent with a polymer having the structure in formula 8 below Formula 8

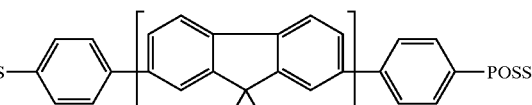

where POSS =

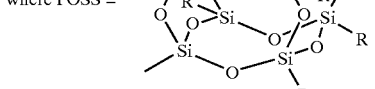

And R = —⟨cyclohexyl⟩

EXAMPLE 9

Synthesis of Polymer 9 (137P)

A dried 3-neck round-bottom flask (500 ml) was fluxed with nitrogen for 30 minutes. In this flask, 30 ml of anhydrous DMF, 2.1 g of 2,2'-dipyridyl (available from Aldrich Chemical), 3.7 g of cyclooctadiene (available from Aldrich Chemical) and 3.8 g of bis(1,5-cyclooctadiene)nickel(0) (available from Aldrich Chemicals) were quickly added. The mixture was heated to 80° C. for 20 minutes, and a shiny purple solution was observed. To this purple solution, 40 ml of deoxygenated toluene containing 2.1 g of 9,9-dihexyl-2,7-dibromoflurene (available from American Dye Source, Inc.) and 0.6 g of 9-ethyl-3,6-dibromocarbzole (available from American Dye Source, Inc.) was added quickly. The mixture was stirred for 48 hours at 80° C. before 0.2 g of 1-[chlorophenyl]-3,5,7,9,11,13,15-heptacyclopentylpentacyclo-9.5.1.13,9.15,15.17,13] octasiloxane (available from Hybrid Plastics, California) was added in. The mixture was then stirred for 48 hours at 80° C. After cooling to room temperature, the reaction mixture was poured into 1000 ml of HCl, 1000 ml of acetone, and 1000 ml of methanol and stirred for 2 hours. The solid was filtered out, redissolved in chloroform, and precipitated in large amount methanol. The pale yellow solid was dried in vacuum at 60° C. for 48 hours and yielded 0.6 g of the final product. Spectroscopic analysis of the final product was consistent with a polymer having the structure in formula 9 below:

flask. The organic layers was then washed 3 times with 500 ml of concentrated aqueous sodium chloride solution and evaporated with a rotary evaporator to a thick paste. This thick paste was then re-dissolved in minimum amount of THF and precipitated in a large amount of methanol. The solid was collected by filtration and drying in air to obtain 2.6 gram of beige powder. Spectroscopic analysis of the beige powder was consistent with a polymer having the structure in formula 10 below

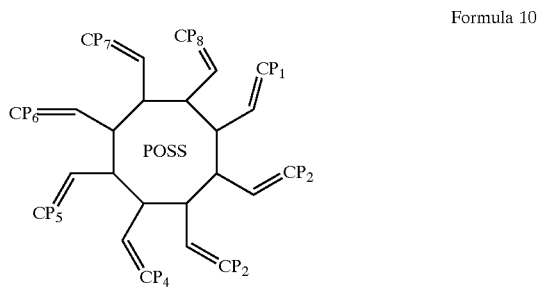

Formula 10

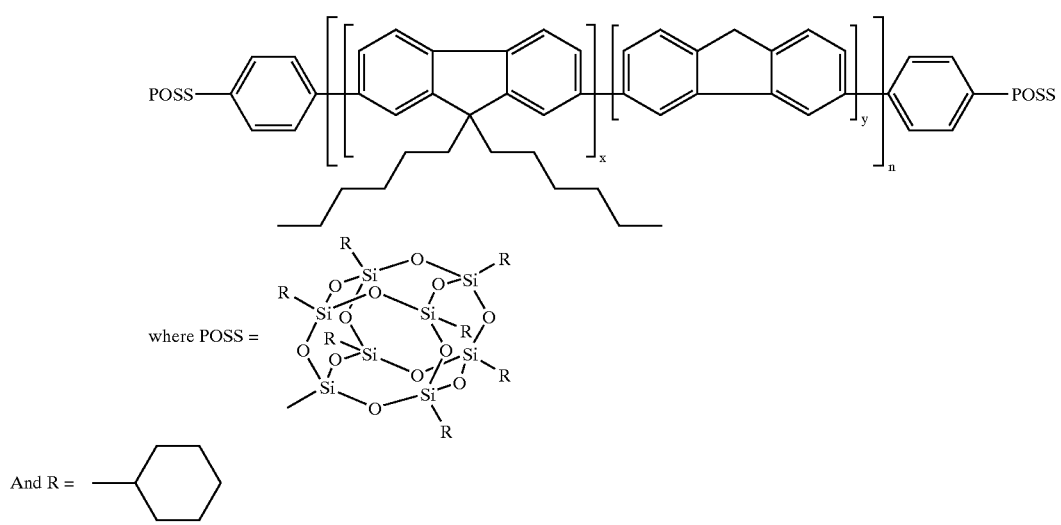

Formula 9

EXAMPLE 10

Synthesis of Polymer 10 (128P)

A dried 3-neck round-bottom flask (500 ml) was fluxed with nitrogen for 30 minutes. In this flask, 100 ml of anhydrous DMF, 0.05 g of palladium (II) acetate (available from Aldrich Chemical), 0.28 g of tri-o-tolyphosphine (available from Aldrich Chemical), 4.0 g of 9,9-dihexyl-2,7-dibromoflurene (available from American Dye Source, Inc.), 0.8 g of divinylbenzene and 4 ml of triethylamine were successively added. The mixtures was heated slowly to reflux and refluxed genteelly for 6 hours before 0.2 gram of 1,3,5,7,9,11,13,15-octavinyl-cyclo-[9.5.1.13,9.15,15.17,13] octasiloxane (available from Hybrid Plastics Inc.) was added. Reflux was maintained for another 12 hours. The resulted mixture was transferred to a 2000 ml of separation flask and 1000 ml of THF was then added to this separation -continued

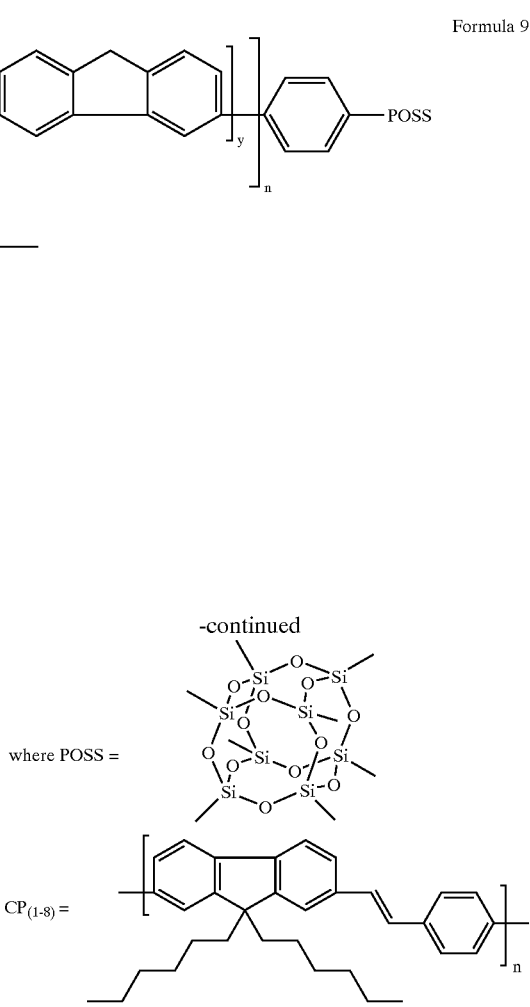

where n is integer that may vary independently for conjugated polymer segments $CP_{1-8}$.

Characterization and Application of Hybrid Polymers Achieved in Accordance with the Present Invention The structures of the polymers prepared in the present invention have been confirmed through NMR and FTIR. Thermal stability has been examined through differential scan calorimeter (DSC).

Molecular weight and polymer dispersion as well has been investigated by gel permeation chromatography (GPC). As shown in FIG. 1, similar molecular weight and molecular weight distribution have been observed for polymer 1 prepared according to the present invention and the referred sample which does not contain silsesquioxane groups. This observation indicated the introduction of silsesquioxane segments to the polymerization reaction system has no significant effect on the polymerization mechanism.

Figure 2:
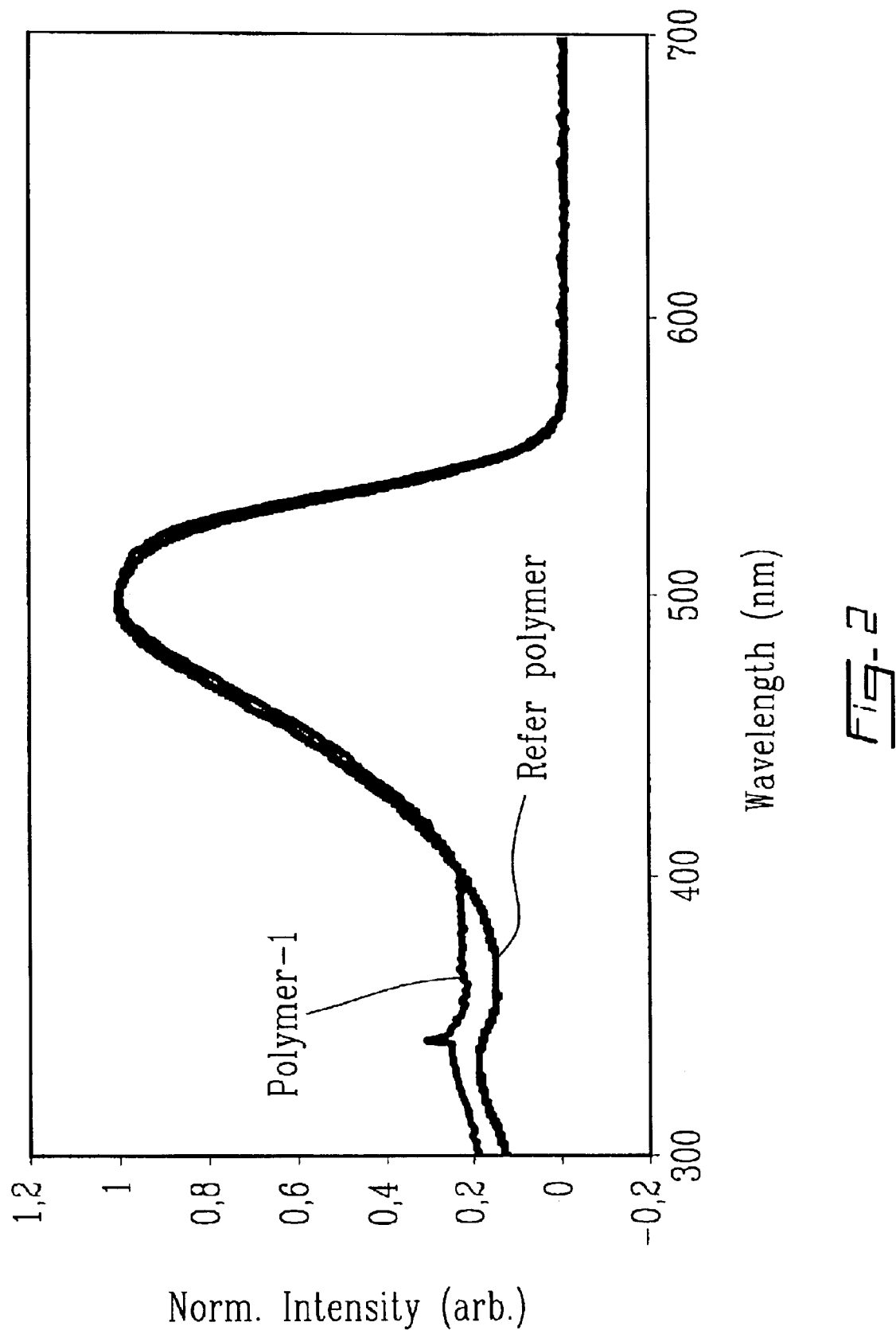
FIG. 2 illustrates the absorption spectra of polymer 1 solution prepared in the present invention and a referred polymer solution without silsesquioxane segments in the polymer backbone or as pendant groups.

Absorption spectra have been recorded for both solution and film. For example, FIG. 2 presents the UV-Vis absorption spectra of polymer 1 solution in THF and the corresponding reference sample solution in THF.

Figure 3:
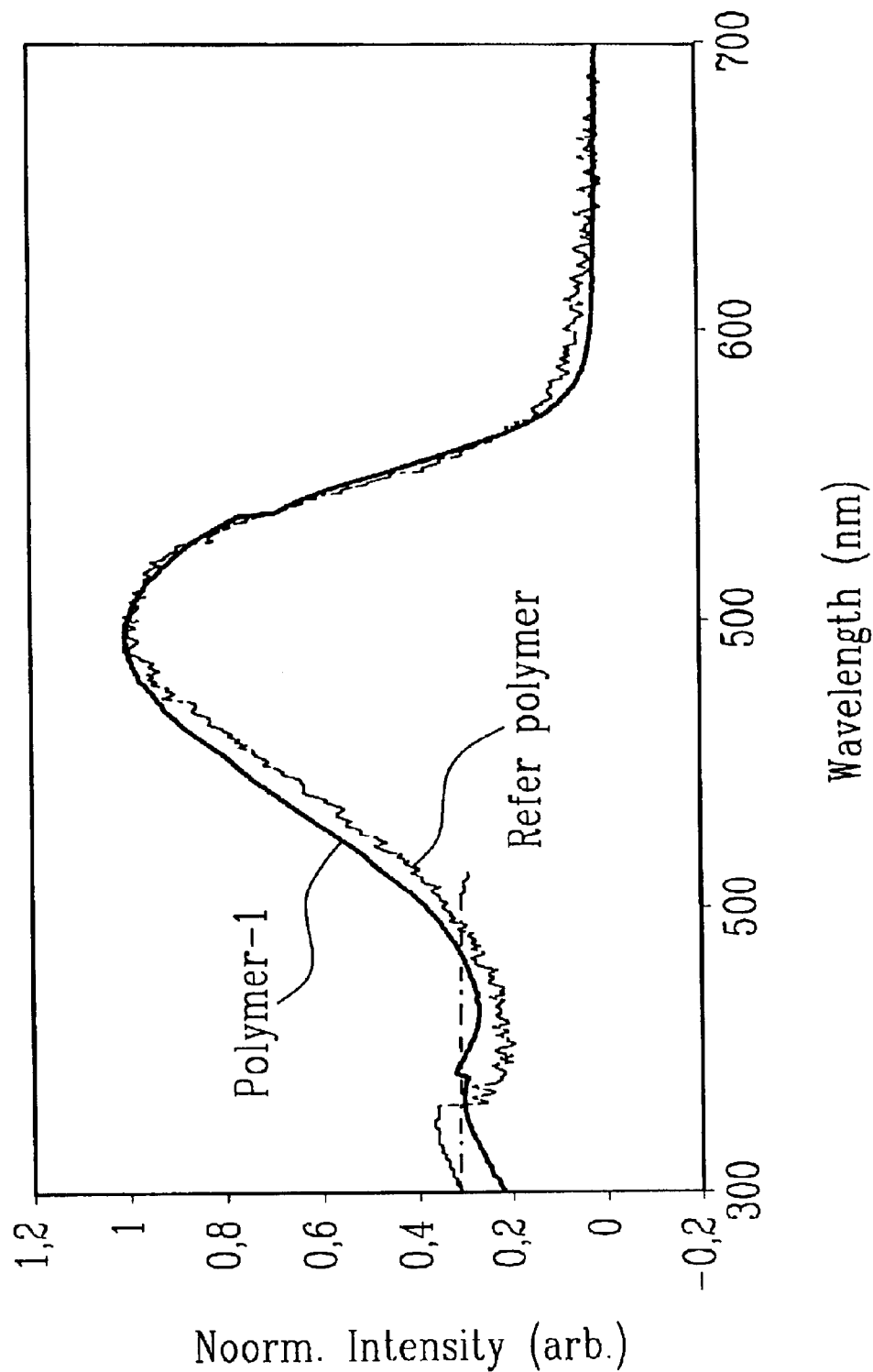
FIG. 3 illustrates the absorption spectra of polymer 1 film prepared in the present invention and a referred polymer film without silsesquioxane segments in the polymer backbone or as pendant groups.

FIG. 3 describes the UV-absorption of polymer 1 as a film on glass and the corresponding reference sample solution as a film on glass. Clearly, the same absorption behavior has been experienced for polymer 1 prepared according to the present invention and the referred sample, which does not contain silsesquioxane groups, in either solution form or in film form. This indicates the introduction of silsesquioxane segment has little effect on the inherent conductivity and energy levels of these conjugated polymers.

Figure 4:
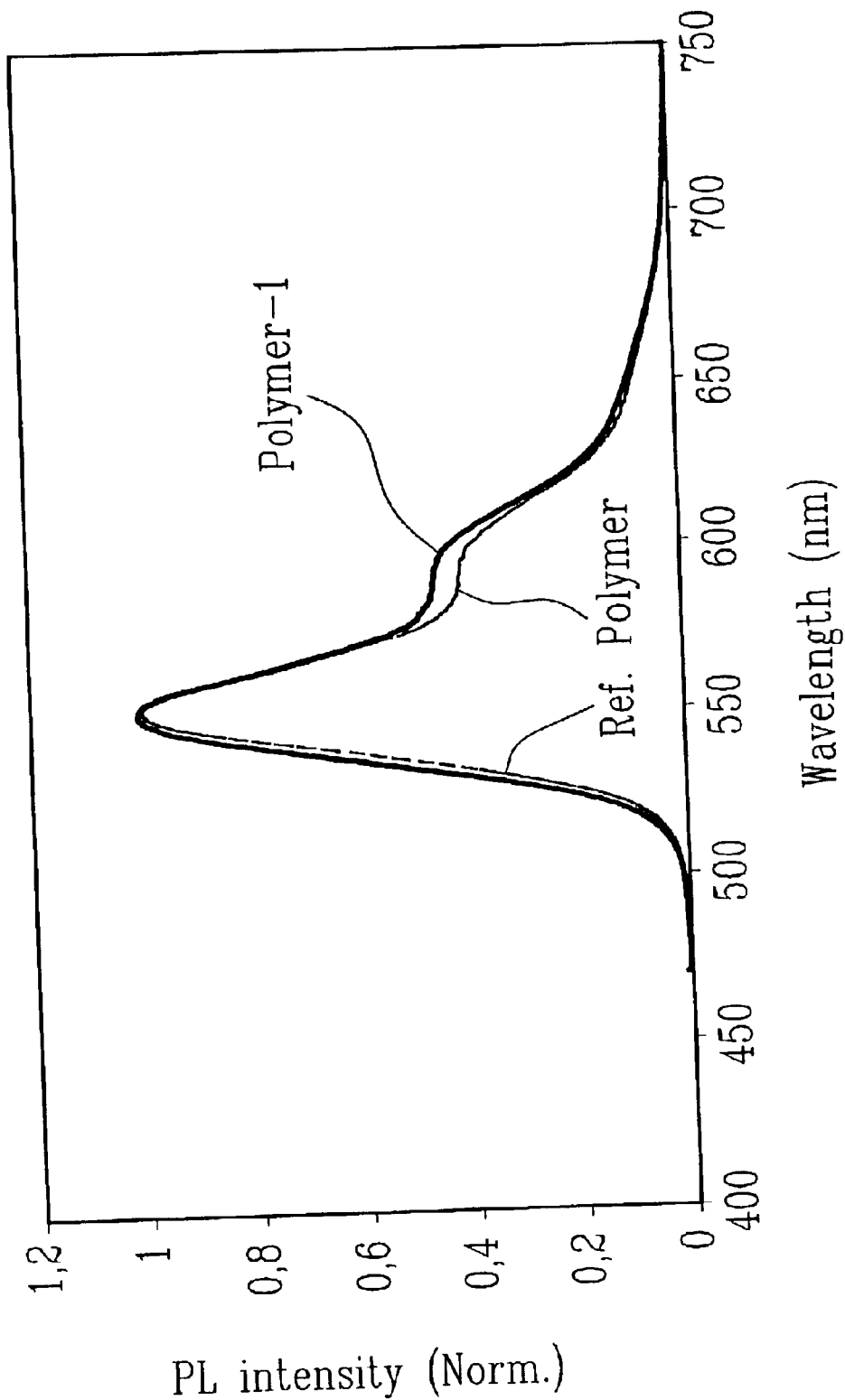
FIG. 4 illustrates the emission spectra of polymer 1 solution prepared in the present invention and a referred polymer solution without silsesquioxane segments in the polymer backbone or as pendant groups.
Figure 5:
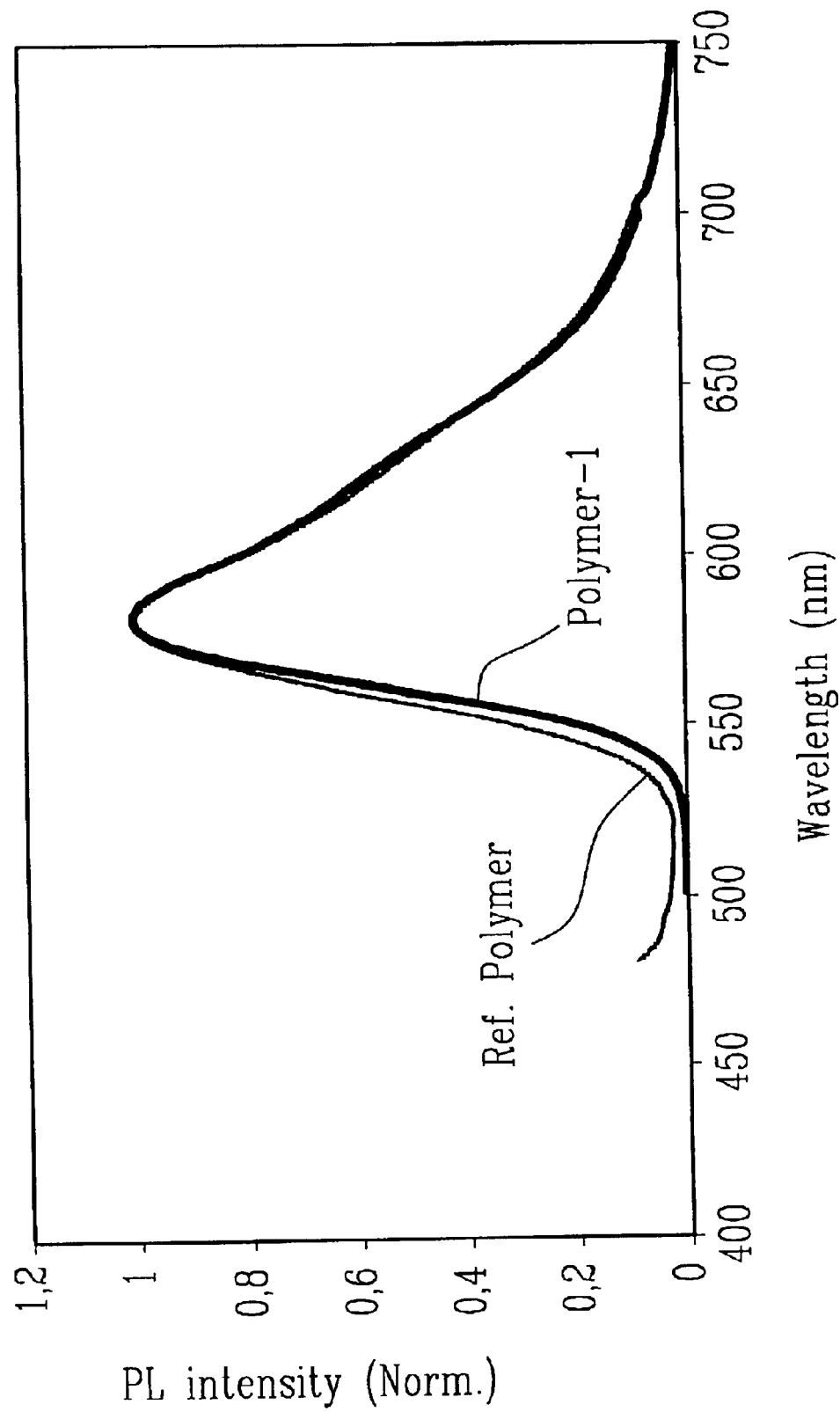
FIG. 5 illustrates the emission spectra of polymer 1 film prepared in the present invention and a referred polymer film without silsesquioxane segments in the polymer backbone or as pendant groups.

Similar conclusion can also be drawn from the emission spectra. FIG. 4 and FIG. 5 compares the emission spectra (PL) of polymer 1 with the corresponding reference sample in THF solution and in film form, respectively. No significant difference in emission behavior between polymer 1 prepared according to the present invention and the referred sample has been observed.

However, a much higher thermal stability was observed for the silsesquioxane segments containing polymers prepared according the present invention comparing to these corresponding conjugated polymers without silsesquioxane segments in the polymer backbone or as pendant groups.

Figure 6:
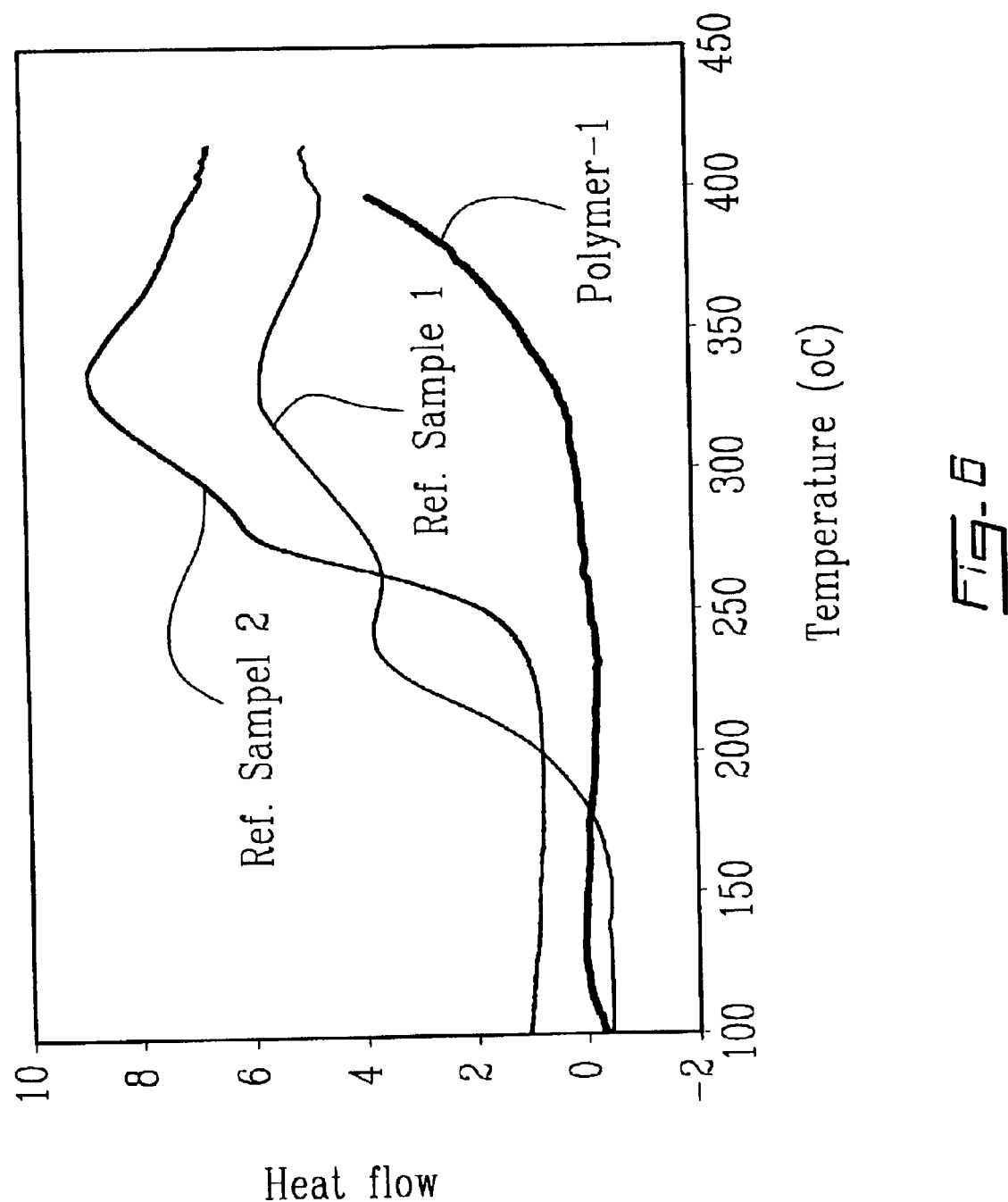
FIG. 6 compares DSC profile of polymer 1 prepared according to the present invention and the corresponding polymers made without silsesquioxane segments in the polymer backbone or as pendant groups.

As shown in FIG. 6, for example, two reference samples of conjugated polymers without silsesquioxane segments begin decomposition at a temperature 200–250° C., polymer 1 prepared according to the present invention can sustain at a temperature over 300° C.

A higher solubility in common organic solvent has also observed for polymers containing silsesquioxane segments prepared according to the present invention comparing the polymer without silsesquioxane segments in the polymer backbone or as pendant groups. For instance, polymer 1 can make a clear THF solution with a concentration over 1%, while the corresponding referred sample without silsesquioxane segments in the polymer backbone or as pendant groups causes gelation even at a concentration less than 0.7%.

TABLE 1

Characterization of polymers according to Examples

| Polymer | GPC | | | DSC | Absorption ($\lambda_{max}$) | | Emission ($\lambda_{max}$) | |
|---|---|---|---|---|---|---|---|---|
| | Mw | Mn | PD | $T_d$(° C.) | THF | Film | THF | Film |
| Examples 1 | 344000 | 97000 | 3.5 | >300 | 498 | 493 | 549 | 585 |
| 7 | 83000 | 41400 | 2.0 | >300 | 339 | 342 | 398 | 406 |
| 8 | 220000 | 96000 | 2.3 | >275 | 392 | 412 | 414 | 426 |
| 9 | 48000 | 17000 | 2.8 | >300 | 380 | 405 | 414 | 425 |
| 10 | 7900 | 5300 | 1.5 | 187 | 380 | 383 | 447 | 473 |

Table 1 summarizes typical results for the selected polymers. The polymers prepared in the present invention are soluble in most common solvents such as THF (tetrahydrofuran), DCM (dicholormethane), DCE (dicholoroethane), toluene, xylene, cholorobenzene and others. The solution made from these polymers can be applied to any substrate in order to make any opto-electronic device such as light emitting diode, solar cell, chemical sensor, etc.

Figure 7:
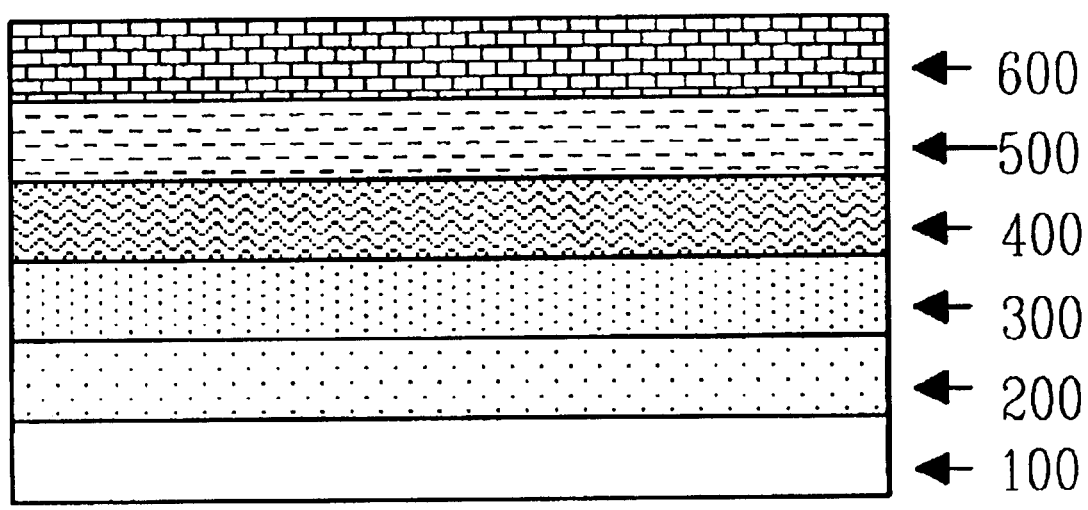
FIG. 7 illustrates a cross-section of a bi-layer EL device which can use a polymer in according with the present invention.

As an application example, FIG. 7 illustrates a cross-section of a bi-layer EL device used polymer 1 prepared in according with the present invention. The EL device was constructed in the following manner:

a). Referring to layer 100, a glass substrate is provided.

b). Referring to layer 200, an indium-tin-oxide (ITO) layer coated on glass substrate layer 100 was sequentially ultra-sonicated in a commercial detergent, rinsed with deionized water, degreased in toluene vapor and exposed to ultraviolet and ozone for a few minutes.

c). Referring to layer 300, a poly(styrenesulfonate)/poly-(2,3-dihydrothieno-[3,4-b]-1,4-dioxin) 1.3 wt % dispersion in water (PEDOT/PSS) (available from Aldrich Chemicals) was then spin-coated onto ITO (layer 200) under the controlled spinning speed to have a thickness between 50–500 nm.

d). Referring to layer 400, a solution of polymer in accordance with the present invention (for example 0.5% of polymer 1 in toluene) was then spin-coated onto PEDOT/PSS layer 300 under a controlled speed. The thickness of the polymer film was between 50 nm and 500 nm.

e). Referring to layer 500, on top of the polymer film (layer 400) was deposited a cathode layer of 200–500 nm thick containing low function metal such as calcium, barium, etc.

f). Referring to layer 600, the cathode layer 500 can be protected by coating a layer of other metal such as aluminum.

Figure 8A:
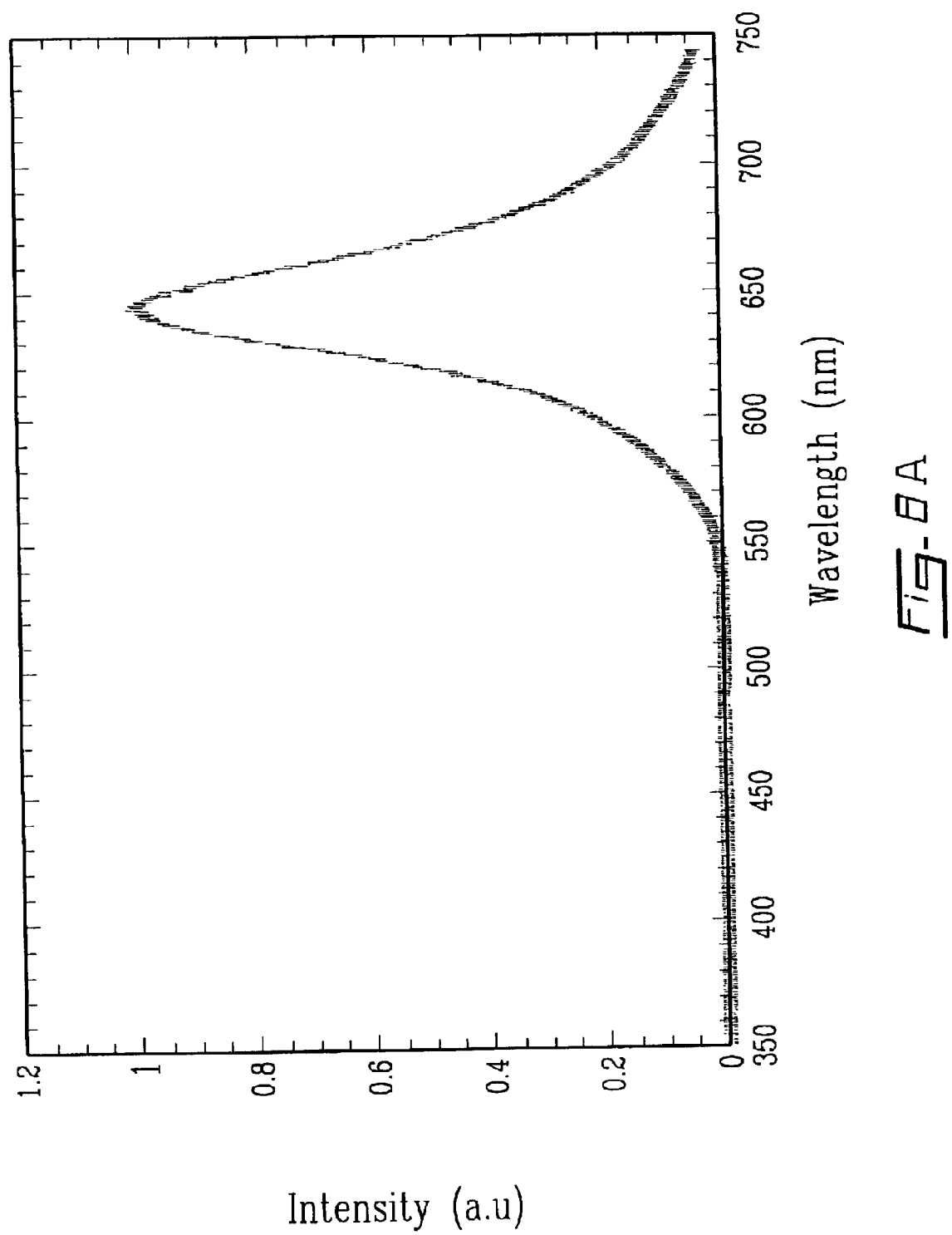
FIG. 8 illustrates electroluminescence spectrum of a bi-layer EL device fabricated from polymer 1 (A) prepared in accordance with the present invention and a comparative prior art polymer (B) without silsesquioxane segments in the polymer backbone or as pendant groups.
Figure 8B:
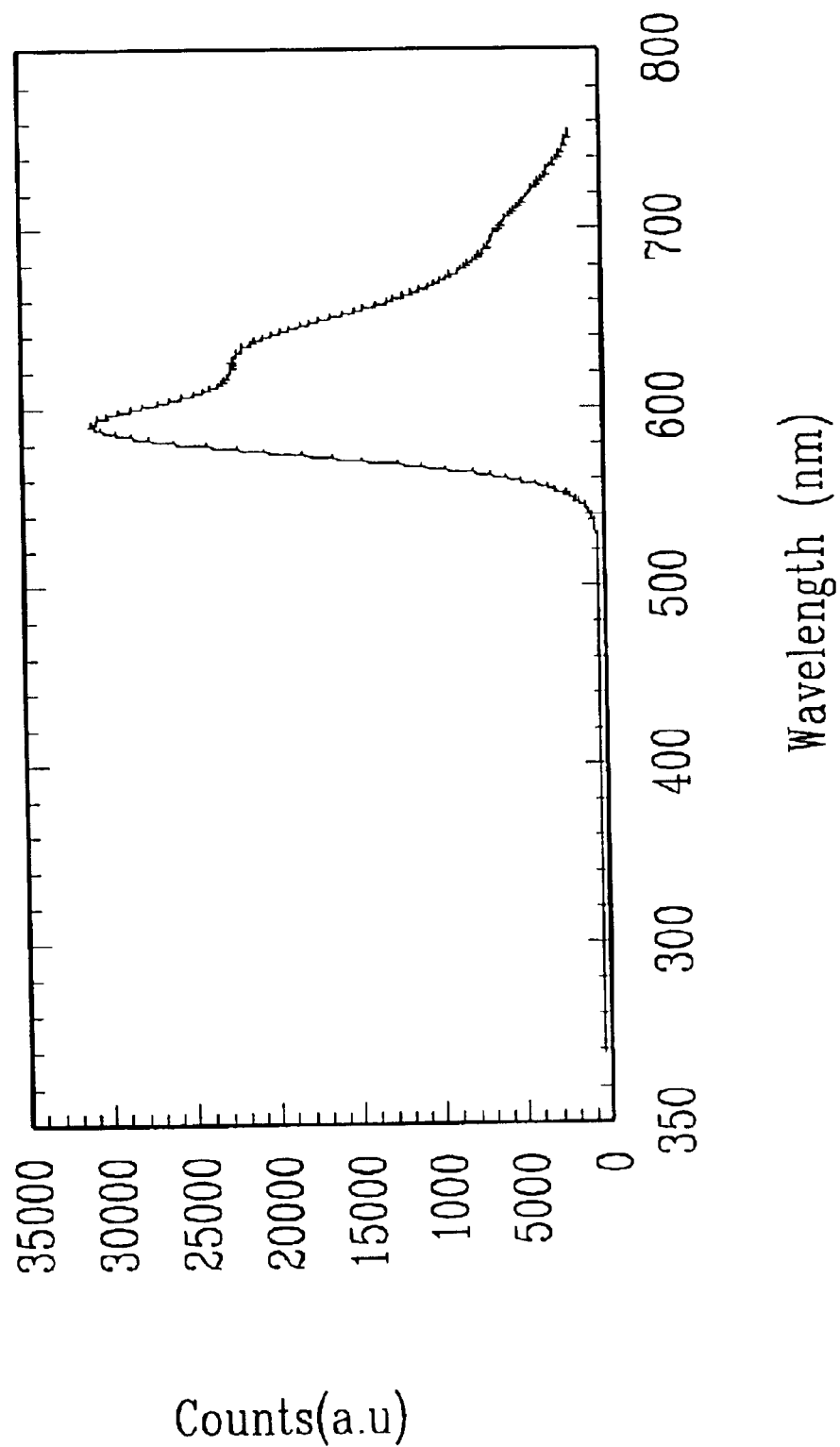

For comparison purposes, a device has been also constructed in the same manner as instructed above but without silsesquioxane segments in the polymer backbone or as pendant groups (prior art polymer). FIGS. 8A and 8B illustrate the electroluminescence spectrum of these two bi-layer EL devices fabricated from polymer 1 and the prior art polymer respectively.

A similar emission color has been observed from both devices. This indicates the introduction of the silsesquioxane segments in the polymer backbone or as pendant groups has little impact on the electronic excited emission mechanism. However as evidenced from Table-2, a device efficiency of 2.2% has been obtained from polymer 1 containing silsesquioxane segments prepared according to the present invention, which is 46% higher than that obtained from the corresponding conjugated polymers without silsesquioxane segments in the polymer backbone or as pendant groups.

TABLE 2

| | | A comparison of device performance. | | | |
|---|---|---|---|---|---|
| Device | Polymer | Voltage (V) | Currency (mA) | Lumin. (cd/m$^2$) | Efficiency (%) |
| FIG. 8A | Polymer 1 | 3.5 | 15.8 | 1320 | 2.2 |
| FIG. 8B (prior art) | Reference | 3.7 | 5 | 249 | 1.5 |

Although the present invention has been described hereinabove by way of preferred embodiments thereof, it can be modified, without departing from the spirit and nature of the subject invention as defined in the appended claims.

What is claimed is:

1. A conjugated polymer having the following formula:

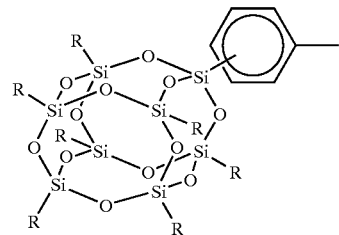

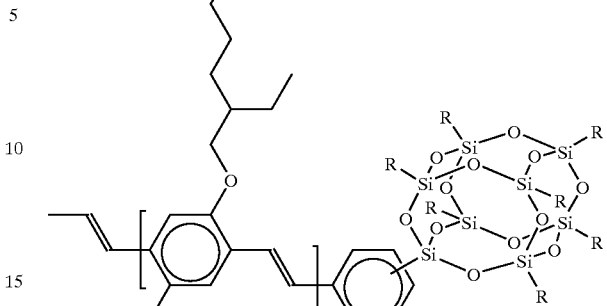

wherein n is from 1 to 1000.

2. A conjugated polymer having the formula:

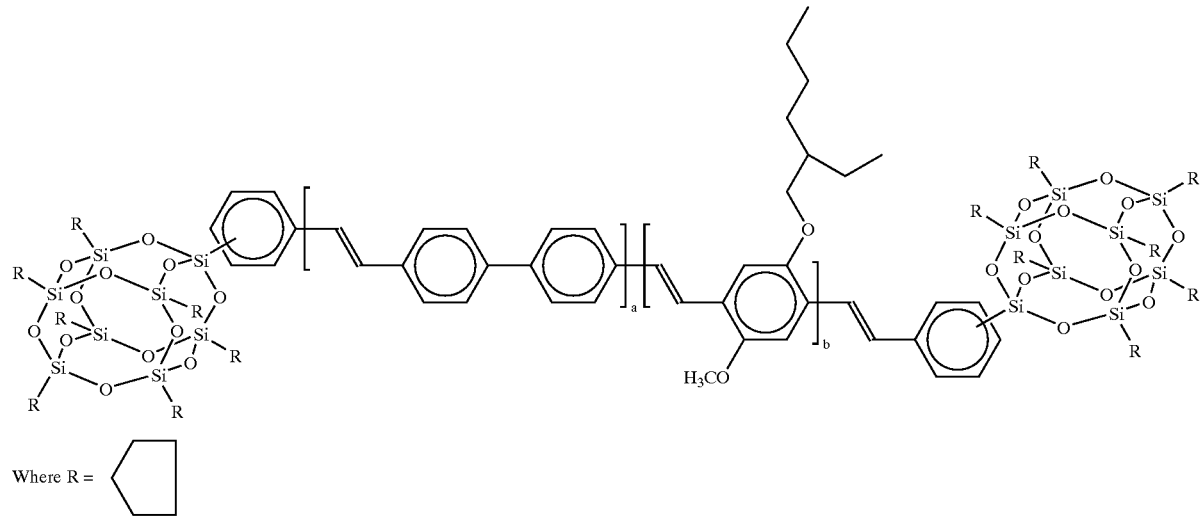

wherein a and b may vary from 0.01 to 0.99.

3. A conjugated polymer having the formula:

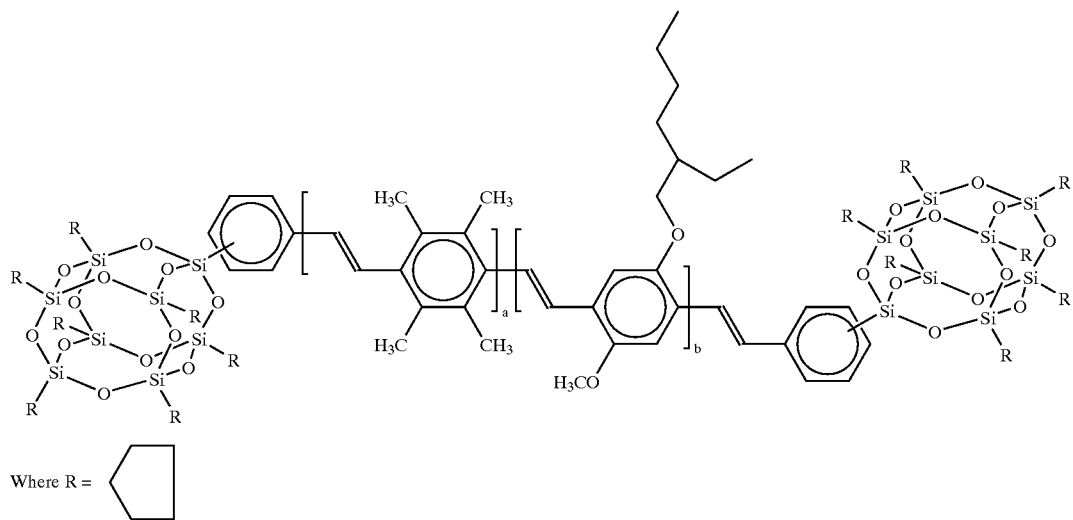
Where R = (cyclopentyl)
wherein a and b may vary from 0.01 to 0.99.
4. A conjugated polymer having the formula:
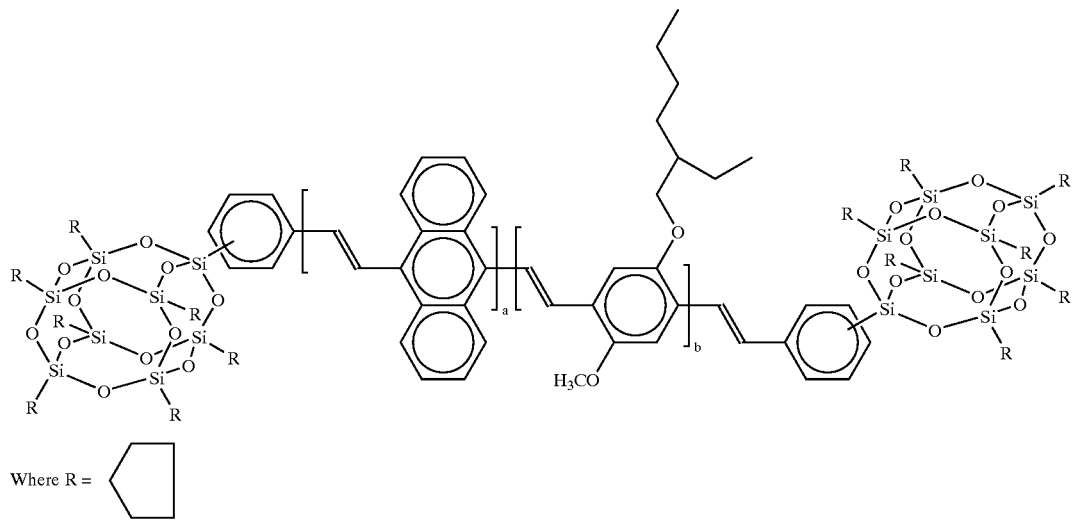
Where R = (cyclopentyl)
wherein a and b may vary from 0.01 to 0.99.
5. A conjugated polymer having the formula:

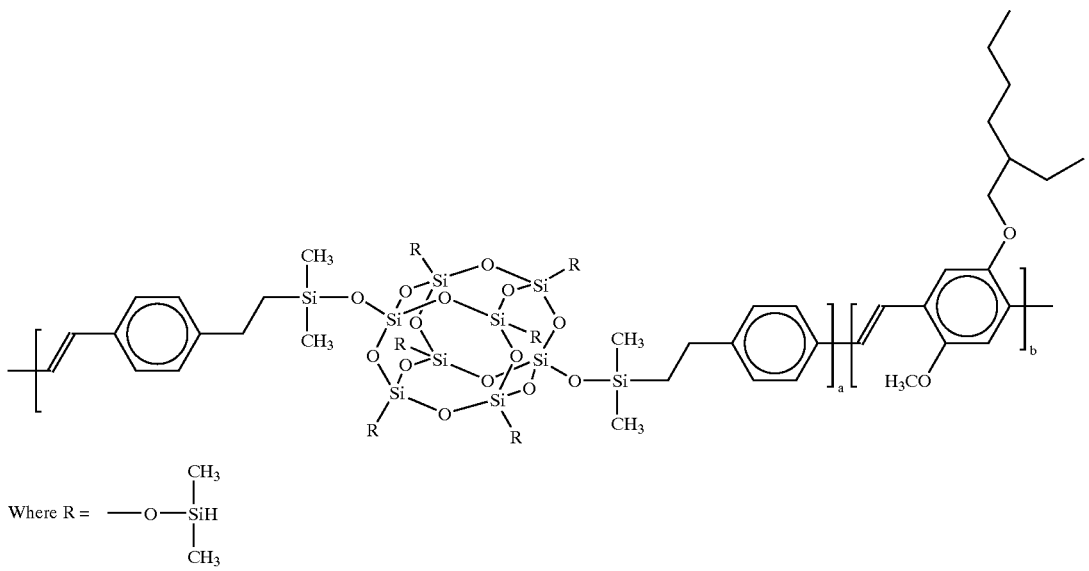
wherein a and b may vary from 0.01 to 0.99.
6. A conjugated polymer having the formula:
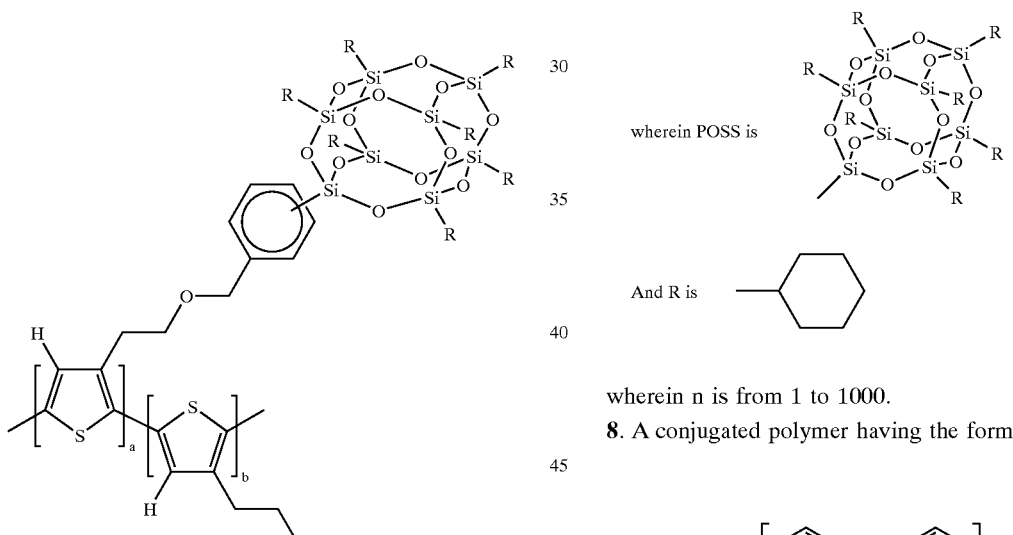
wherein a and b may vary from 0.01 to 0.99.
7. A conjugated polymer having the formula:
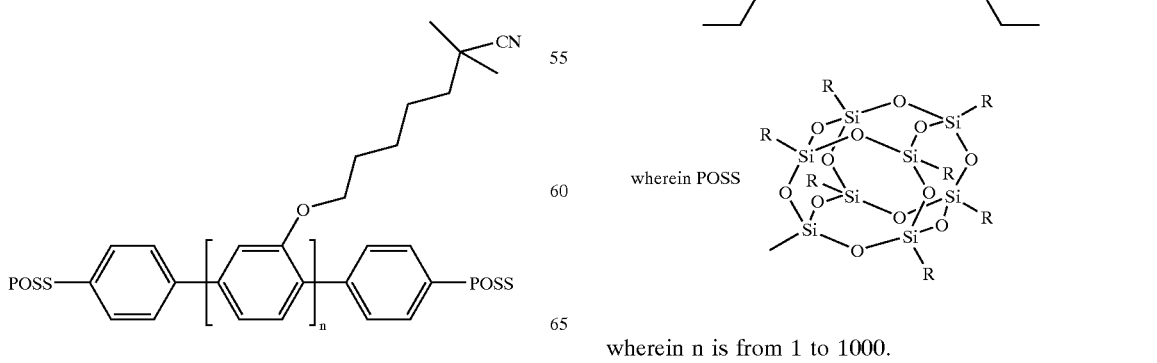
wherein POSS is
[structure shown]
And R is —[cyclohexyl]
wherein n is from 1 to 1000.
8. A conjugated polymer having the formula:
[structure shown]
wherein POSS
[structure shown]
wherein n is from 1 to 1000.

9. A conjugated polymer having the formula:

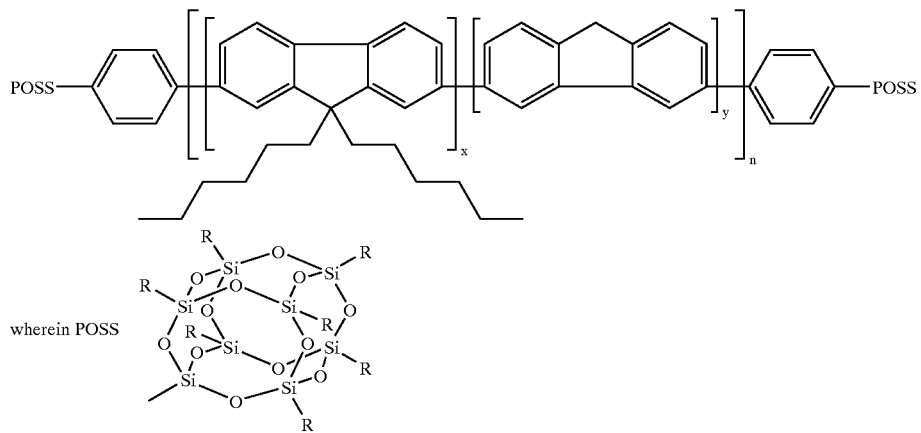

wherein x, y and n are independently integers.

10. A conjugated polymer having the formula:

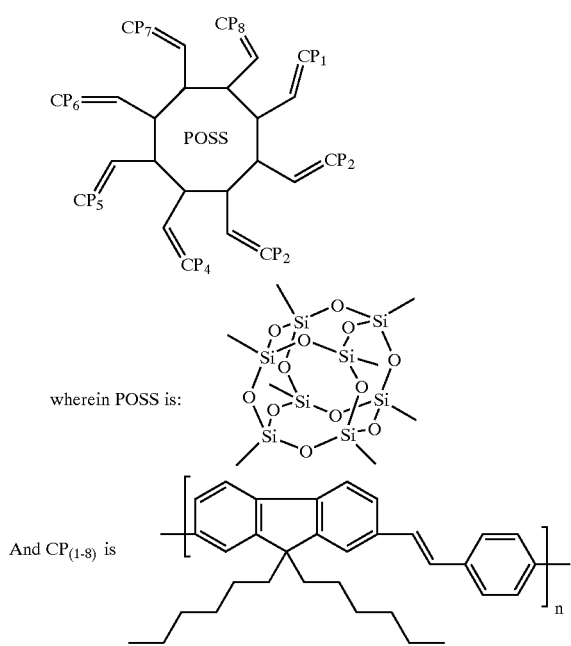

where n is integer that may vary independently for conjugated polymer segments $CP_{1-8}$.

11. An opto electronic device comprising the conjugated polymer of claim 1.

12. An opto electronic device comprising the conjugated polymer of claim 2.

13. An opto electronic device comprising the conjugated polymer of claim 3.

14. An opto electronic device comprising the conjugated polymer of claim 4.

15. An opto electronic device comprising the conjugated polymer of claim 5.

16. An opto electronic device comprising the conjugated polymer of claim 6.

17. An opto electronic device comprising the conjugated polymer of claim 7.

18. An opto electronic device comprising the conjugated polymer of claim 8.

19. An opto electronic device comprising the conjugated polymer of claim 9.

20. An opto electronic device comprising the conjugated polymer of claim 10.

* * * * *